United States Patent
Shichino

(10) Patent No.: US 10,122,635 B2
(45) Date of Patent: Nov. 6, 2018

(54) NETWORK CONTROLLER, CLUSTER SYSTEM, AND NON-TRANSITORY COMPUTER-READABLE RECORDING MEDIUM HAVING STORED THEREIN CONTROL PROGRAM

(71) Applicant: FUJITSU LIMITED, Kawasaki-shi, Kanagawa (JP)

(72) Inventor: Nobuyuki Shichino, Kahoku (JP)

(73) Assignee: FUJITSU LIMITED, Kawasaki (JP)

( * ) Notice: Subject to any disclaimer, the term of this patent is extended or adjusted under 35 U.S.C. 154(b) by 48 days.

(21) Appl. No.: 15/347,857

(22) Filed: Nov. 10, 2016

(65) Prior Publication Data
US 2017/0142016 A1    May 18, 2017

(30) Foreign Application Priority Data
Nov. 18, 2015 (JP) ................................ 2015-225667

(51) Int. Cl.
*H04L 12/801* (2013.01)
*H04L 12/855* (2013.01)
(Continued)

(52) U.S. Cl.
CPC ........ *H04L 47/193* (2013.01); *H04L 47/2466* (2013.01); *H04L 67/10* (2013.01); *H04L 67/1097* (2013.01); *H04L 69/163* (2013.01)

(58) Field of Classification Search
None
See application file for complete search history.

(56) References Cited

U.S. PATENT DOCUMENTS 8,363,549 B1 * 1/2013 Zhu ..................... H04L 63/0218
370/225
2005/0283529 A1 * 12/2005 Hsu ..................... H04L 67/1095
709/224
(Continued)

FOREIGN PATENT DOCUMENTS

| JP | 2002-344450 | 11/2002 |
| JP | 2006-215635 | 8/2006 |
| JP | 2011-518486 | 6/2011 |

OTHER PUBLICATIONS

Webopedia, "spoof", https://www.webopedia.com/term/s/spoof.html, Feb. 5, 2005.*

*Primary Examiner* — Faruk Hamza
*Assistant Examiner* — Cassandra L Decker
(74) *Attorney, Agent, or Firm* — Fujitsu Patent Center

(57) ABSTRACT

A network controller including a virtual network setter that sets a virtual communication interface; a dummy packet generator that obtains communication progress information representing a communication progress state of communication of the second processing device with the connection destination device by causing the virtual communication interface to process a dummy packet that causes a receiver of the dummy packet to falsely recognize that the dummy packet is transmitted from the connection destination device; a reset packet generator that generates a reset packet containing the communication progress information; and a reset packet processor that removes, based on the reset packet, connection record information of the second processing device and the connection destination device, the connection record information being stored in the second processing device. This configuration prevents congestion when a processor is switched to another in a cluster system from occurring.

6 Claims, 19 Drawing Sheets

(51) Int. Cl.
*H04L 29/08* (2006.01)
*H04L 29/06* (2006.01)

(56) References Cited

U.S. PATENT DOCUMENTS

| | | |
|---|---|---|
| 2006/0174012 A1 | 8/2006 | Yamazaki et al. |
| 2009/0254775 A1 | 10/2009 | Coffey et al. |
| 2013/0155902 A1* | 6/2013 | Feng .................. H04L 67/1031 370/255 |
| 2014/0330977 A1* | 11/2014 | van Bemmel .......... H04L 69/22 709/226 |
| 2015/0082378 A1* | 3/2015 | Collison ................ H04L 63/20 726/1 |
| 2015/0143157 A1* | 5/2015 | Chen .................. H04L 67/1034 714/4.3 |
| 2015/0370665 A1* | 12/2015 | Cannata .............. G06F 11/2012 714/4.11 |

* cited by examiner

NETWORK CONTROLLER, CLUSTER SYSTEM, AND NON-TRANSITORY COMPUTER-READABLE RECORDING MEDIUM HAVING STORED THEREIN CONTROL PROGRAM

CROSS-REFERENCE TO RELATED APPLICATION

This application is based upon and claims the benefit of priority of the prior Japanese Patent application No. 2015-225667, filed on Nov. 18, 2015, the entire contents of which are incorporated herein by reference.

FIELD

The embodiment discussed herein is directed to a network controller, a cluster system, and a non-transitory computer-readable recording medium having stored therein a control program.

BACKGROUND

FIG. 10-19 are diagrams illustrating the behavior of a traditional cluster system 500.

The cluster system 500 illustrated in FIG. 10 includes a cluster 503, an Ether Switch 502, and a client 501. The client 501 is connected to the cluster 503 via the Ether Switch 502.

The cluster 503 includes a device 504 and a device 505 to form a cluster configuration. Hereinafter, the device 504 and the device 505 may sometimes referred to as a device #1 and a device #2, respectively. The client 501 is connected to the devices #1 and #2 via a Local Area Network (LAN), and the Ether Switch 502 is disposed on the LAN.

The Ether Switch 502 switches the connection counterpart to the client 501 between the devices #1 and #2. In detail, the Ether Switch 502 switches between the devices #1 and #2 to selectively connect either device to the client 501. For example, when one of the devices #1 and #2 goes down, the Ether Switch 502 switches the connection counterpart to the other.

In the example of FIG. 10, the client 501 has an IP address "192.168.0.128" and the devices #1 and #2 have IP addresses "192.168.0.1" and "192.168.0.2", respectively.

In the state illustrated in FIG. 10, the client 501 is connected to the device #1 and processes jobs through the Transmission Control Protocol (TCP) communication.

Under this state, when the device #1 goes down, the IP address of the device #1 is added to the device #2 (see arrow P1) as illustrated in FIG. 11, and the client 501 is connected to the device #2. The job being executed in the device #1 is transferred to the device #2 and the client 501 performs TCP communication with the device #2 to continue the process.

At that time, the device #2 stores therein a record (TCP connection information) of connection related to the TCP communication established with the client 501 (see Arrow P2).

TCP uses a sequential number for management of communication data. The TCP connection information includes the sequential number (see Arrow P3). The sequential number is sometimes used by a job.

After the device #1 is restored, the job of the device #1, which job has been executed by device #2 on behalf of the device #1, is returned to the device #1. The client 501 is connected to the device #1 and performs the TCP communication with the device #1 to continue the process.

In this case, the TCP connection information used by the job that the device #2 has performed on behalf of the device #1 is left in the device #2 (see Arrow P4). This is because TCP connection information is management information inside the Operating System (OS) and is therefore not able to be modified by an external application program.

In the device #1, restarting the communication with the client 501 proceeds to the communication of "Sequential no. B", as illustrated in FIG. 13 (see Arrow P5).

[Patent Literature 1] Japanese Laid-open Patent Publication No. 2002-344450
[Patent Literature 2] Japanese Laid-open Patent Publication No. 2006-215635
[Patent Literature 3] Japanese unexamined Patent Application Publication (Translation of PCT application) No. 2011-518486

In the state illustrated in FIG. 13, in cases where the device #1 goes down again, the device #2 takes over the job being executed in the device #1 as illustrated in FIG. 14.

In this event, the client 501 that is using the cluster 503 makes an access to the device #2, using the TCP connection information before the device #1 goes down. In this access, a TCP port number used for an access from the client 501 coincides with the TCP connection information left in the device #2.

Here, in cases where the sequential numbers of the client 501 and the device #2, which communicate with each other, mismatch, congestion of TCPACK (acknowledgement) occurs.

As described above, the TCP uses a sequential number for management of communication data. In cases where the sequential number is different from an expected value, the receiver transmits a response (ACK) to the sender to request transmission of data having the expected sequential number.

If the sender, which has received this ACK, is not able to prepare the requested data, the sender transmits the sequential number that the sender manages to the receiver for the acknowledgement (ACK). This means that the sender and the receiver reply to each other with respective expected sequential numbers.

In the example of FIGS. 14 and 15, since the communication between the client 501 and the device #1 proceeds to "Sequential no. B", the client 501 sends the sequential number "B+1" successive to "B" to the device #2.

In contrast to the above, since the TCP connection information ("Sequential no. A") used in the last communication with the client 501 is left in the device #2 (see Arrow P6 in FIG. 14), the device #2 expects the sequential number "A+1" next to "A".

As the above, the expected sequential number of the client 501 mismatches that of the device #2. The device #2 replies to the client 501 with ACK requesting transmission of data having a sequential no. "A+1". Unfortunately, the client 501, which receives the ACK, is unable to prepare the requested data and replies with ACK notifying that the next sequential no. in the client 501 is "B+1".

Repeating (congestion) of such a reply with ACK continues until communication time-out (more than seconds), which is one of the cause of delay in switching in the cluster.

The TCP connection information 60 is managed by the kernel of an OS and is not easily deleted.

This delay is ordinary in a Network File System (NFS) server having a cluster configuration.

Congestion caused from repetitious ACK reply occurs also in cluster switching caused from Link down.

The cluster system illustrated in FIG. 15 is in a state where the client 501 is communicating with the device #1 and the communication has proceeded to "Sequential no. X" (see Arrow P7). The device #1 is further connected to another client via a non-illustrated different LAN and processes a job from the other client.

As illustrated in FIG. 16, the LAN connecting the device #1 to the Ether Switch 502 is assumed to link down (see Arrow P8). However, since no failure occurs in the other LAN (not illustrated) that connects the device #1 to the other client (not illustrated), the device #1 continues to function as a device that processes a job from the other client.

As illustrated in FIG. 17, in the cluster 503, the IP address of the LAN that has come to be disable the device #1 is appended to the device #2 (see Arrow P9), so that the job being carried out by the device #1 is taken over by the device #2. This proceeds the communication of the device #2 with the client 501 to "Sequential no. Y" (see Arrow P10).

After that, as illustrated in FIG. 18, when the LAN that connects the device #1 to the client 501 links up (see Arrow P11), the IP address of the device #1, which address is set in the device #2, is returned to the device #1 (see Arrow P12) and the job that has been taken over by the device #2 is resumed.

At that time, the TCP connection information used by the job that the device #2 has performed on behalf of the device #1 is left in the device #2 (see Arrow P13).

Since the client 501 using the cluster 503 proceeds the communication with the device #2 to "Sequential no. Y", the client 501 sends an ACK attaching thereto the sequential number "Y+1" successive to "Y" to the device #1.

In contrast to the above, since the TCP connection information ("Sequential no. X") used for the last communication with the client 501 is left in the device #1 (see Arrow P14) as illustrated in FIG. 19, the device #1 expects the sequential number "X+1" successive to "X".

This causes mismatch in sequential number between the client 501 and the device #2, which TCP communicate with each other, and consequently congestion of TCP ACK occurs.

As described above, such a traditional cluster system causes congestion TCPACK when the sequential number of the client 501 mismatches those of the devices #1 and #2 constituting the cluster 503 at resuming communication.

SUMMARY

As an aspect of the embodiment, there is provided a network controller for a cluster system, the cluster system including a first processing device and a second processing device and being communicably connected with a connection destination device, the network controller being included in the second processing device and including a processor that: in a case where a communication counterpart with the communication destination device is switched from the second processing device to the first processing device, sets a virtual communication interface; obtains communication progress information representing a communication progress state of communication of the second processing device with the connection destination device by causing the virtual communication interface to process a dummy packet that causes a receiver of the dummy packet to falsely recognize that the dummy packet is transmitted from the connection destination device; generates a reset packet containing the communication progress information using the obtained communication progress information; and removes, based on the reset packet, connection record information of the second processing device and the connection destination device, the connection record information being stored in the second processing device.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENT(S)

Hereinafter, a network controller, a cluster system, and a non-transitory computer-readable recording medium having stored therein a control program according to a first embodiment will now be detailed with reference to accompanying drawings. The following first embodiment is exemplary and has no intention to exclude various modifications and applications of techniques not referred in the first embodiment. In other words, various changes and modifications can be suggested without departing from the spirit of the first embodiment. The drawings do not illustrate therein all the functions and elements included in the embodiment and may include additional functions and elements to those illustrated in the accompanying drawings.

Figure 1:
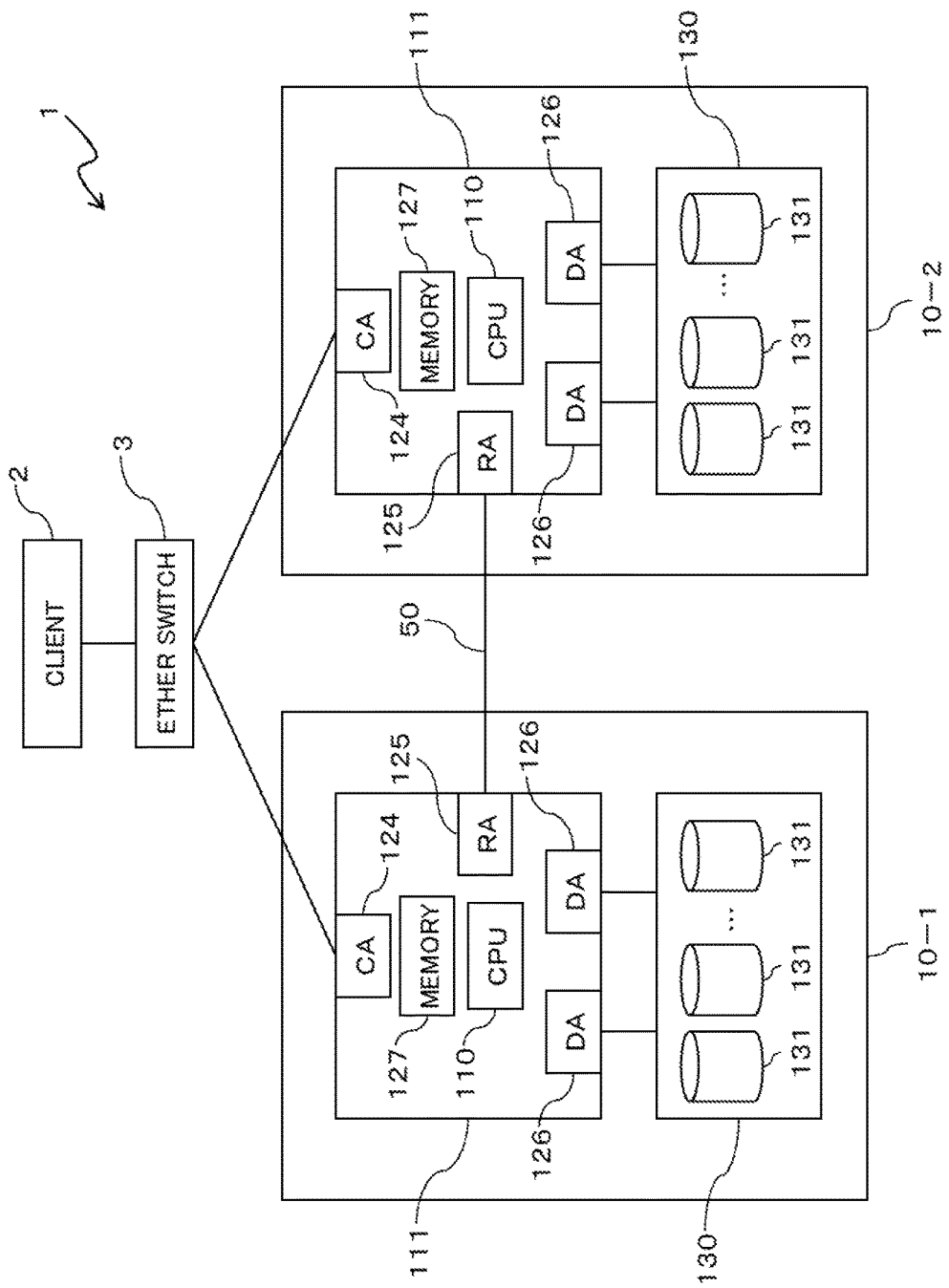
FIG. 1 is a diagram illustrating an example of a hardware configuration of a storage system according to a first embodiment.
Figure 2:
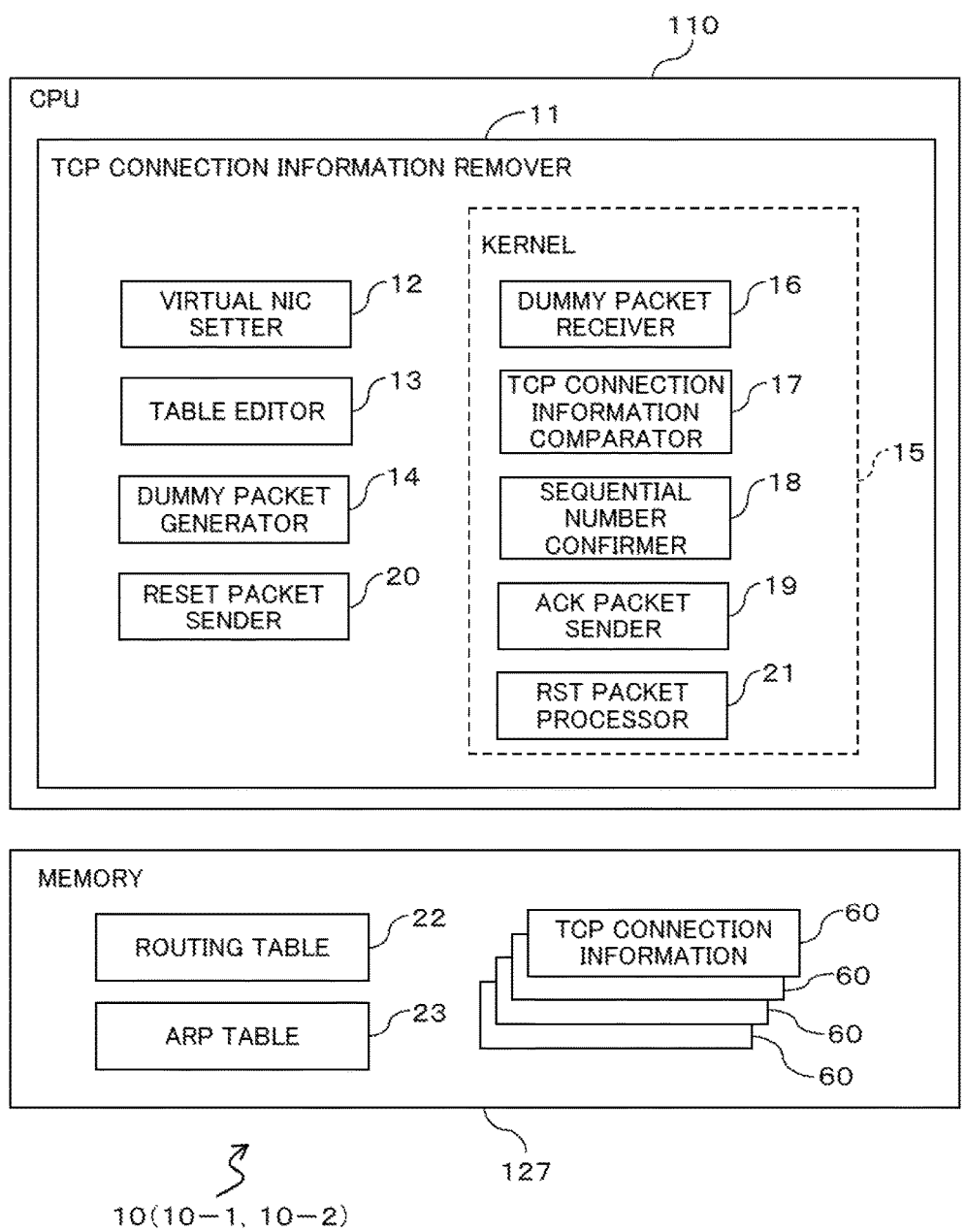
FIG. 2 is a diagram illustrating an example of a functional configuration of a storage system of the first embodiment.

(A) Configuration:

FIG. 1 is a diagram illustrating an example of the hardware configuration of a storage system 1 according to the first embodiment and FIG. 2 is a diagram illustrating the functional configuration of the storage system 1.

As illustrated in FIG. 1, the storage system of the first embodiment includes multiple (two in the example of FIG. 1) storage devices 10-1 and 10-2 communicably connected to one another via a communication line 50. The storage devices 10-1 and 10-2 may be arranged geographically remotely from each other.

The storage devices 10-1 and 10-2 are the same in configuration as each other. Hereinafter, when either storage device needs to be specified, a reference number 10-1 or 10-2 is used; but an arbitrary storage device is represented by a reference number 10.

The storage devices 10-1 and 10-2 constitute a cluster system. The storage devices 10-1 and 10-2 are redundant. With this configuration, in cases where one of the storage devices has a failure, the other takes over the operation being performed by the failure device, so that reliability of the system can be enhanced because the down time can be shortened.

To the storage devices 10-1 and 10-2, the client 2 is connected via the Ether Switch 3.

The client 2 has a function of writing and reading data into and from the volumes (logical volumes, virtual volumes) of the storage devices 10-1 and 10-2 connected thereto.

The client 2 is an information processing apparatus, and is exemplified by a computer equipped with a Central Processing Unit (CPU) and a memory, which are not illustrated.

The Ether Switch 3 switches the connection counterpart to the client 2 between the storage devices 10-1 and 10-2. The Ether Switch 3 switches between the storage devices 10-1 and 10-2 to selectively connect either device to the client 2. For example, when one of the storage devices 10-1 and 10-2 goes down, the Ether Switch 3 switches the connection counterpart to the other.

The storage devices 10-1 and 10-2 manage, for example, an NAS volume and provide the client 2 with respective memory regions.

Each storage device 10 includes one or more (one in the first embodiment) Controller Modules (information processing apparatuses) 111.

The communication line 50 data-communicably connects the storage devices 10 to each other and forwards data via, for example, the standard of TCP/IP (Internet Protocol).

As illustrated in FIG. 1, each storage device 10 includes the CM 111 and a disk enclosure 130.

The CM 111 is in charge of various controls in the storage device 10. Specifically, the CM 111 carries out various controls such as control on an access to a disk device 131 of the disk enclosure 130 in obedience to a storage access request (access control signal) from the client 2. All the CMs 111 are the same in hardware configuration.

The disk enclosure 130 includes one or more disk devices 131, which are exemplified by a Hard Disk Drive (HDD) and a Solid State Drive (SSD). In the storage device 10, the memory region of the HDD 131 is allocated to the logical volume. The disk enclosure 130 may configure Redundant Arrays of Inexpensive Disks (RAID) by using multiple HDDs 131.

As illustrated in FIG. 1, the CM 111 includes a Communication Adapter (CA) 124, a Remote Adapter (RA) 125, the CPU 110, Device Adapters (DAs) 126, and a memory 127. In the example of FIG. 1, one CM 111 is provided to each storage device 10, but alternatively, two or more CMs 111 may be provided to each storage device 10.

The CA 124 is an interface controller that communicably connects the CM 111 to the client 2 and includes a Network Interface Card (NIC) for a LAN interface. The CM 111 is connected to the client 2 by the CA 124 via a LAN, receives an IO command from the client 2 and sends and receives data to and from the client 2.

The RA 125 is an interface controller that (remotely) communicably connects the CM 111 to another storage device 10 via the communication line 50. An example of the communication line 50 is a Peripheral Component Interconnect Express (PCIe) bus, and in this case, the RA 125 corresponds to a PCIe bus adaptor.

Accordingly, the CM 111 of the storage device 10-1 is connected to the CM 111 of the storage device 10-2 via the communication line 50. The two CMs 111 and the communication line 50 constitute a communication system.

Each DA 126 is an interface controller that communicably connects the CM 111 to the disk enclosure 130 and is exemplified by a fiber channel adaptor.

The memory 127 is a memory device including a Read Only Memory (ROM) and a Random Access Memory (RAM). In the ROM of the memory 127, software program (control program) related to a TCP connection information removing process that is to be described below and data for this program are written. The software program on the memory 127 is occasionally read and then executed by the CPU 110. The RAM of the memory 127 are used as a primary storing memory or a working memory.

Furthermore, TCP connection information 60, a routing table 22, and an ARP table 23 are stored in a predetermined region of the memory (RAM) 127.

A program to be executed by the CPU 110 and various pieces of data are stored in the ROM of the memory 127.

The CPU 110 is a processor that carries out various controls and calculations and achieves various functions by executing programs stored in, for example, the memory 127.

As illustrated in FIG. 2, the CPU 110 of the storage device 10 functions as the TCP connection information remover 11.

The program (control program) that achieves the function of the TCP connection information remover is provided in the form of being recorded in a tangible and non-transient computer-readable storage medium, such as a flexible disk, a CD (e.g., CD-ROM, CD-R, and CD-RW), a DVD (DVD-ROM, DVD-RAM, DVD-R, DVD+R, DVD-RW, DVD+RW, and HD DVD), a Blue-ray Disc™, a magnetic disk, an optical disk, and an magneto-optical disk. A computer reads the program from the recording medium using a non-illustrated medium reader and stores the read program in an internal or external storage device for future use. Alternatively, the program may be recorded in a recording device (recording medium) such as a magnetic disk, an optical disk, or a magneto-optical disk, and may be provided from the recording device to the computer via a communication path.

Further alternatively, in achieving the functions of the TCP connection information remover 11, the program (the control program) stored in an internal storage device (the memory 127 in the first embodiment) is executed by the microprocessor (the CPU 110 of the first embodiment) of the computer. At that time, the computer may read the program stored in the recording medium and may execute the program.

Hereinafter, description will now be made on the assumption that the OS is Linux®.

In cases where switching in the cluster generates an event that moves an IP address of a storage device to the other storage device, the TCP connection information remover 11 achieves a process to remove the TCP connection information 60 that is no longer needed from the moving source (switching source) storage device 10.

The first switching from one storage device 10 (e.g., the storage device 10-1) to the other storage device 10 (e.g., the storage device 10-2) does not cause ACK congestion because the TCP connection information 60 is not left in switching-destination storage device 10.

A requisite situation for ACK congestion is that the TCP connection information is left in the storage device 10 and the IP address and the TCP port number of the new TCP communication coincide with those in the left TCP connection information. Since normal TCP communication selects the port number on the side of the client 2 from a large number of pools, there is low possibility that the selected port number coincide with the port number in the left TCP connection information. In contrast to the above, the NFS client selects a port number on the side of the client from a pool containing several candidates, there is high possibility that the selected port number coincide with the port number in the left TCP connection information.

Even if ACK congestion does not occur, the TCP connection information 60 sometimes remains until a new TCP connection request having the same IP address and the same IP port is issued (see caution four for a case where the TCP connection information disappears after a predetermined time elapses). This means that the remaining TCP connection information occupies a memory resource in the system.

Figure 11:
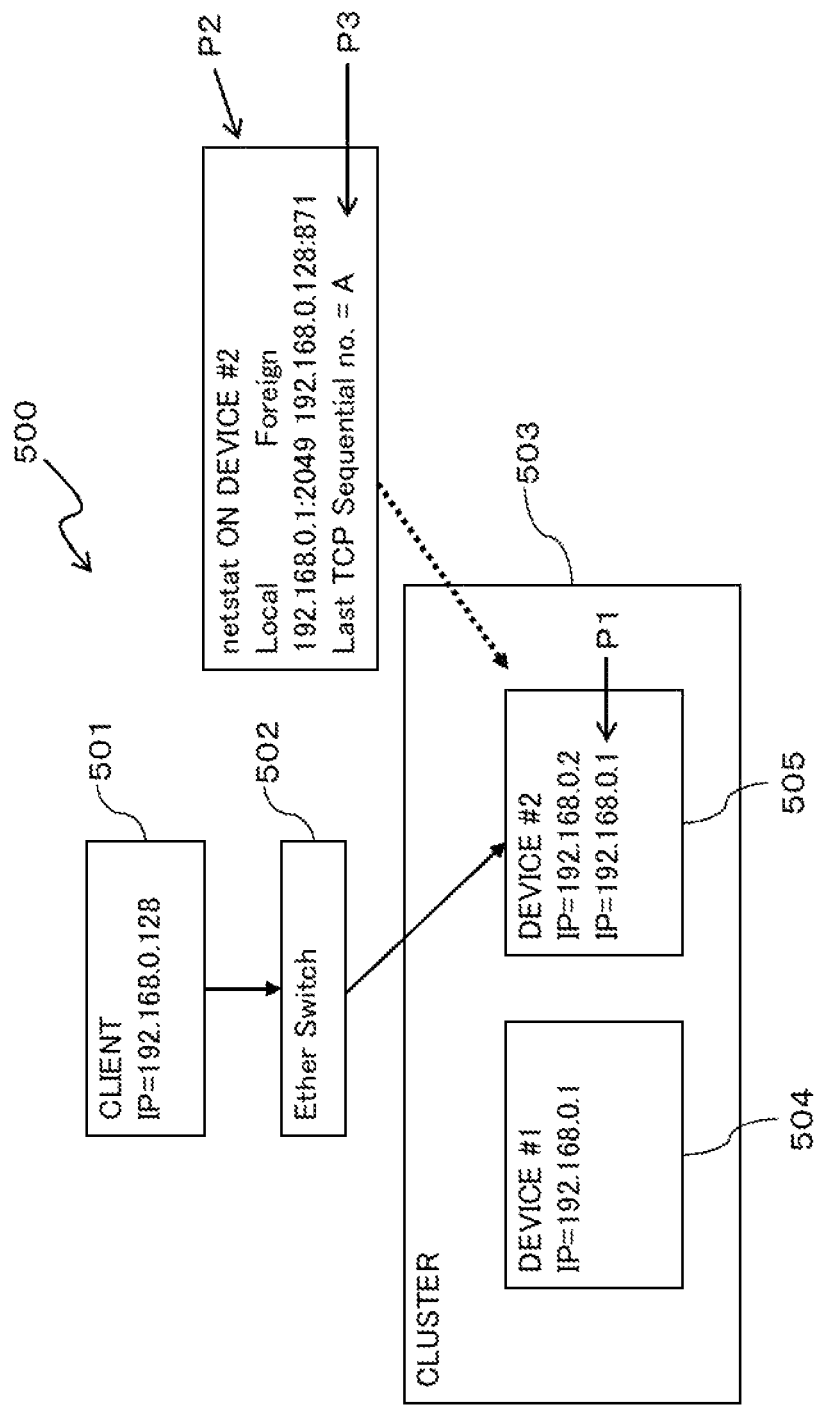
FIG. 11 is a diagram illustrating the behavior of a traditional cluster system.
Figure 12:
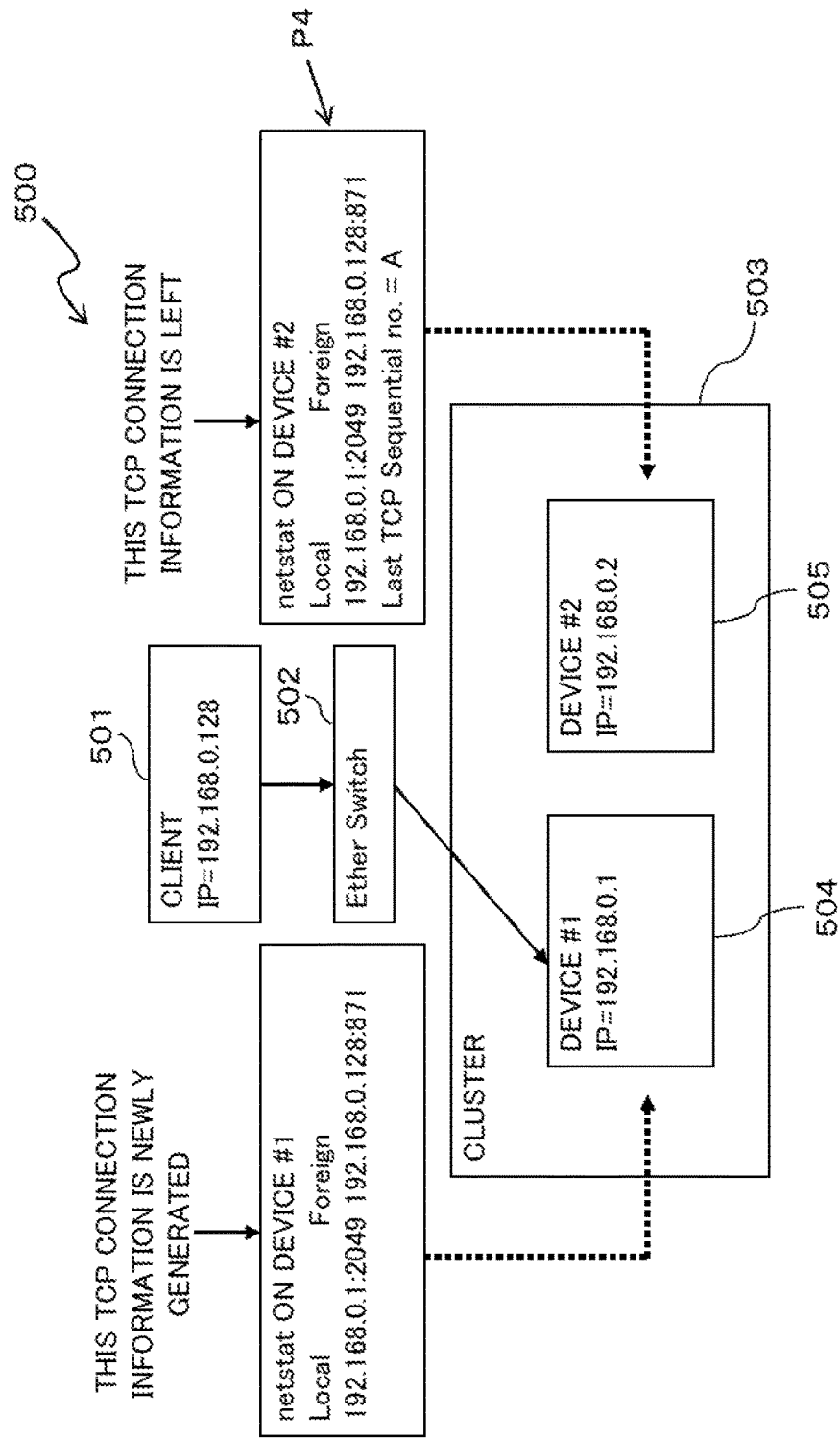
FIG. 12 is a diagram illustrating the behavior of a traditional cluster system.
Figure 13:
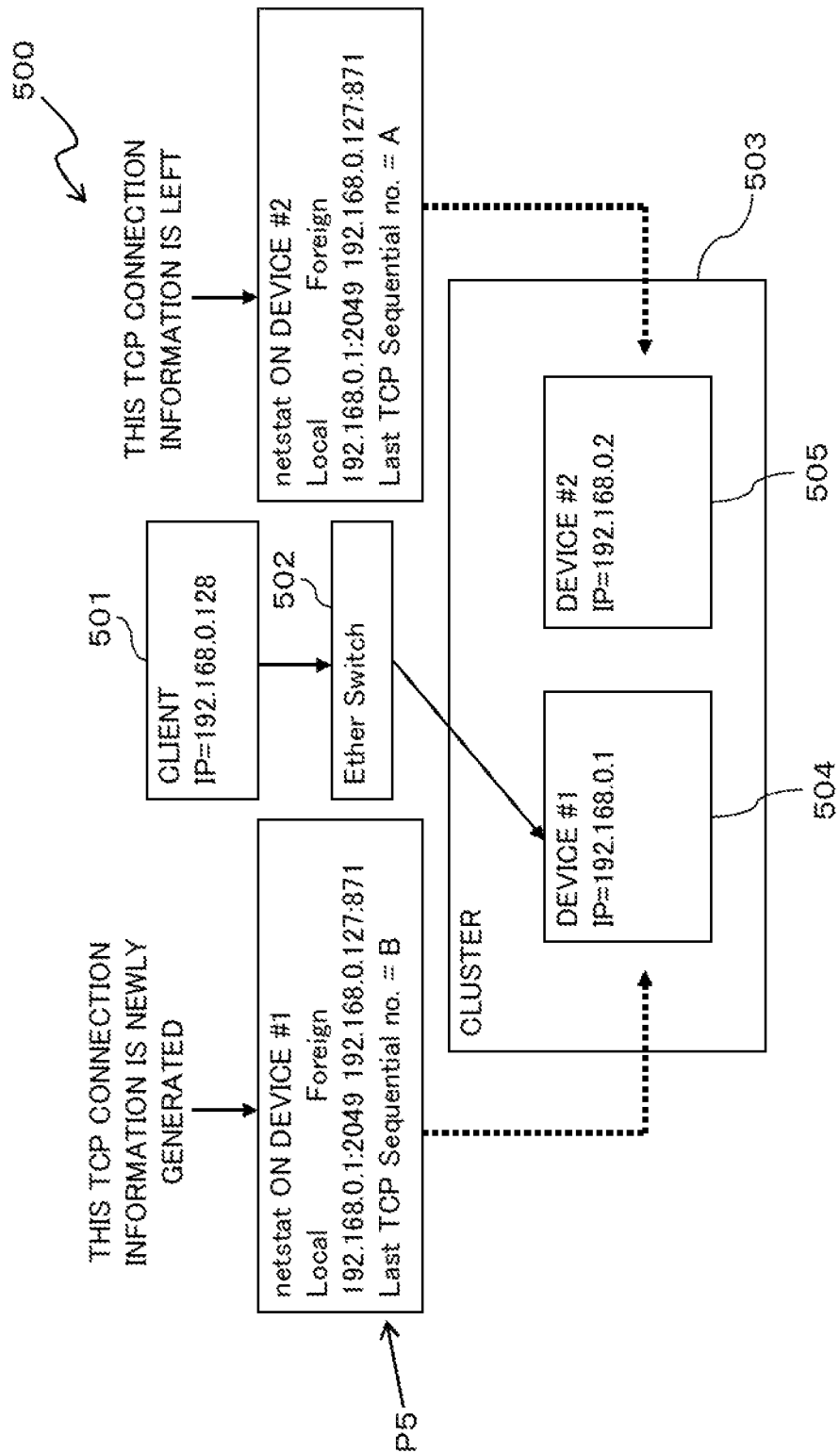
FIG. 13 is a diagram illustrating the behavior of a traditional cluster system.
Figure 14:
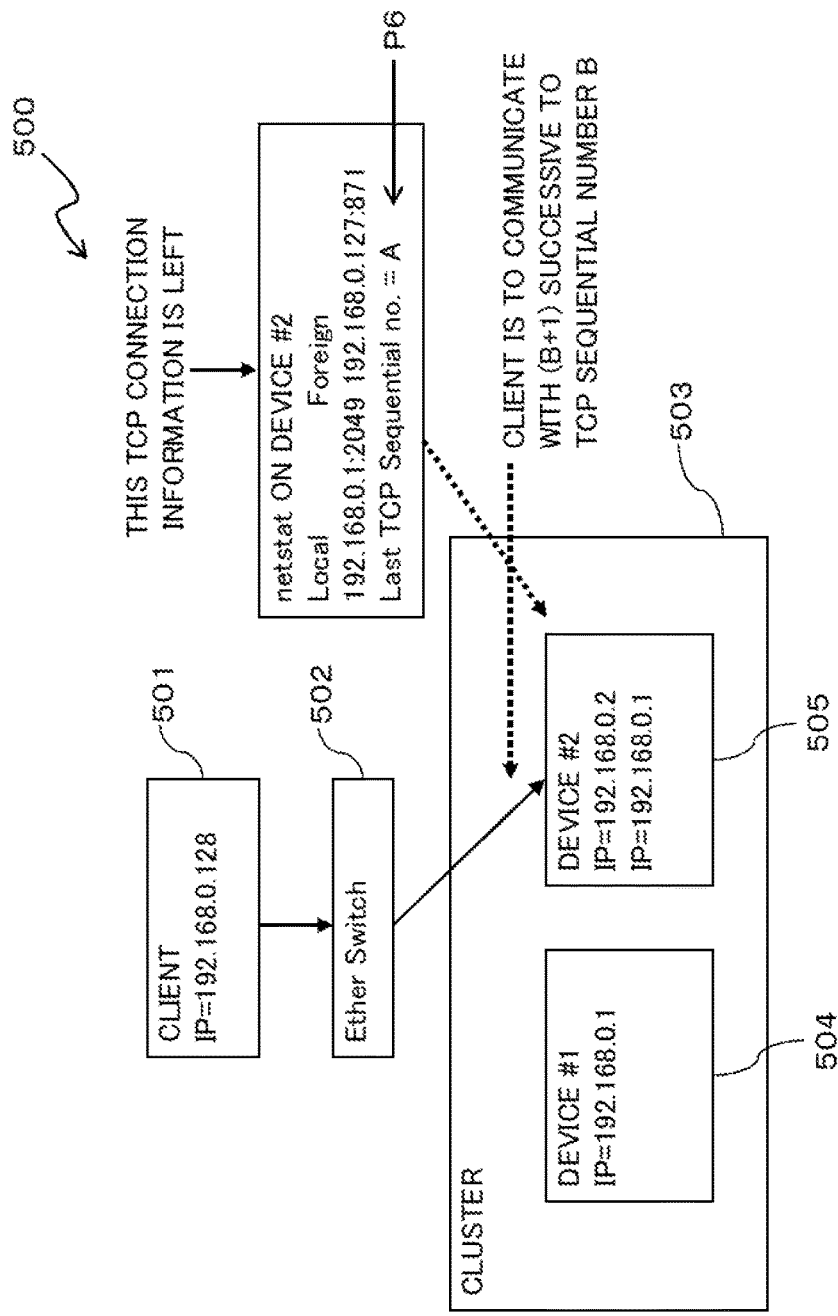
FIG. 14 is a diagram illustrating the behavior of a traditional cluster system.
Figure 15:
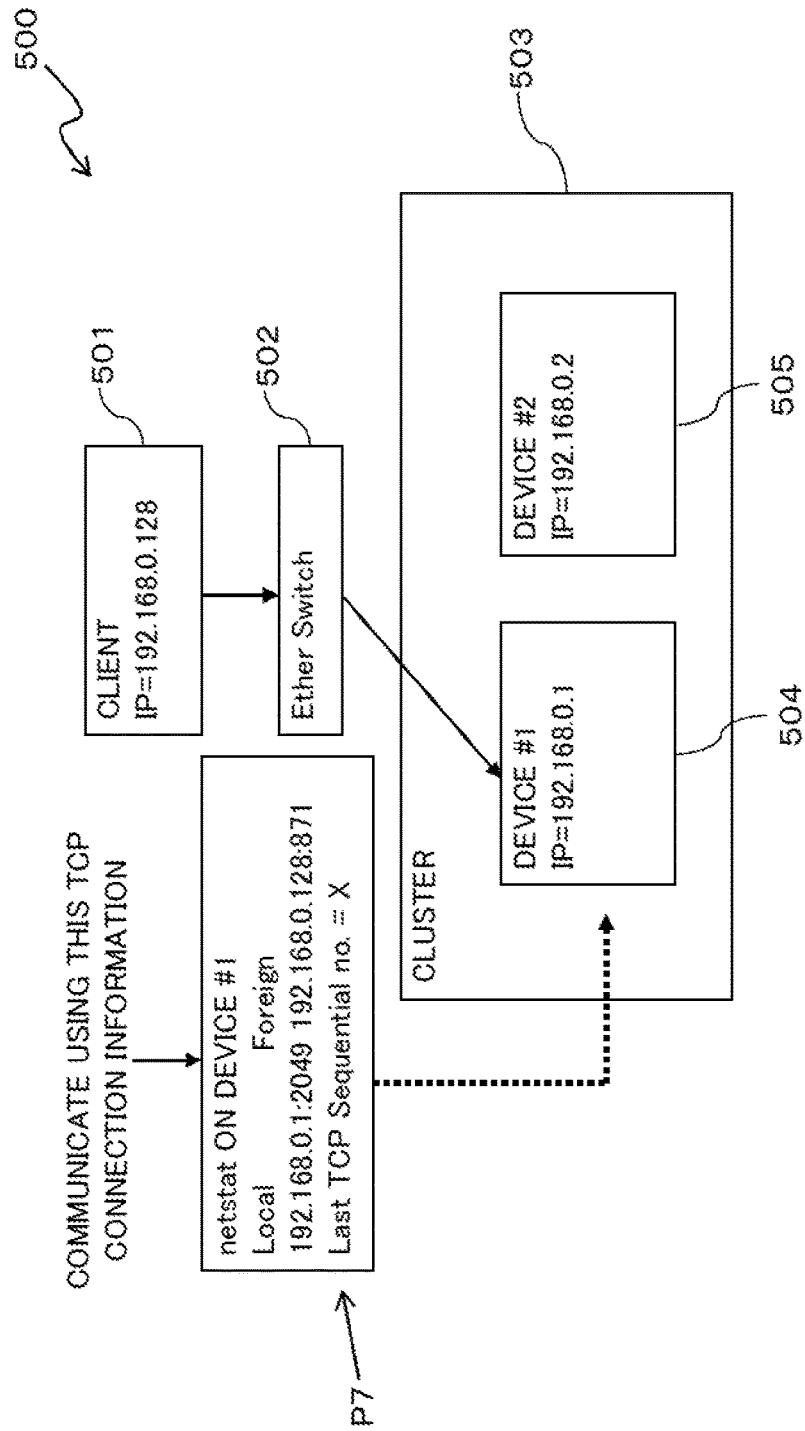
FIG. 15 is a diagram illustrating the behavior of a traditional cluster system.
Figure 16:
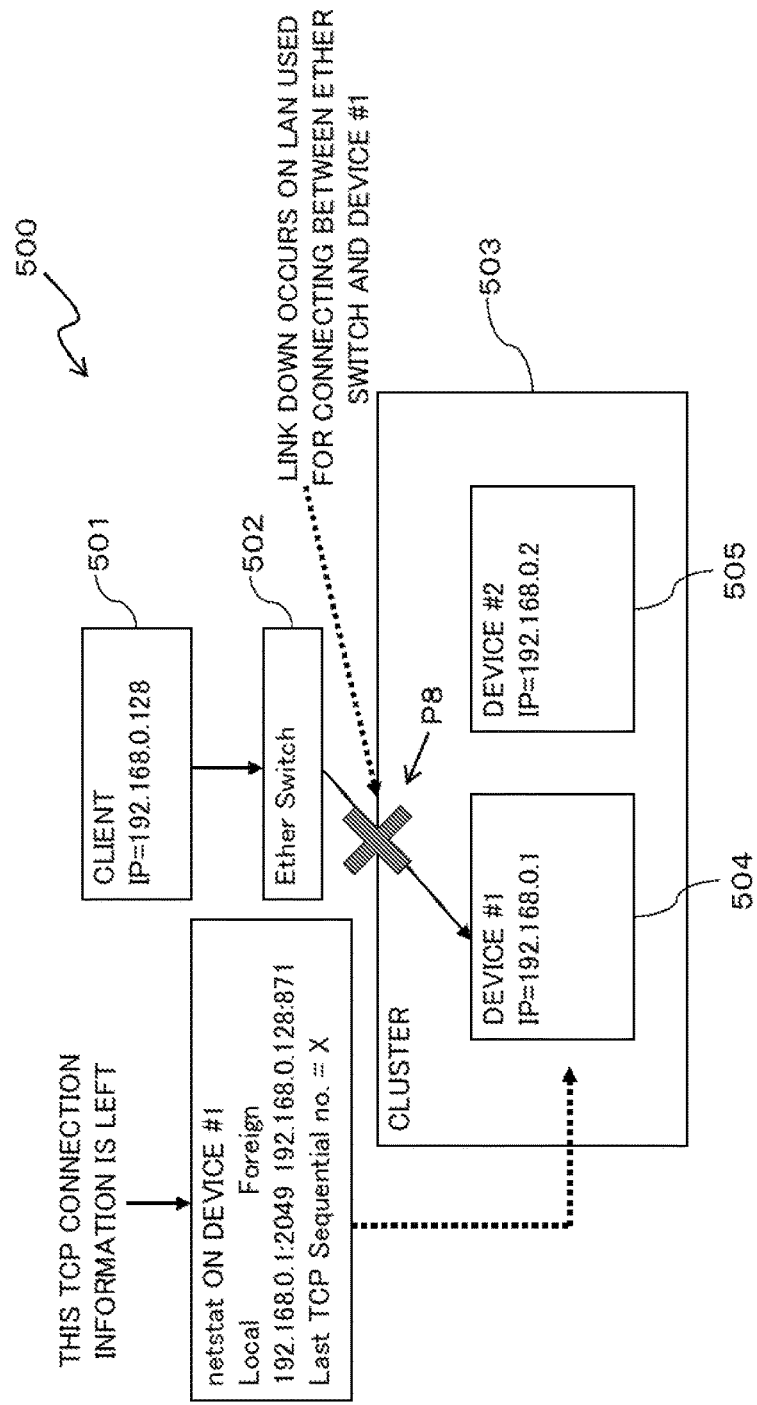
FIG. 16 is a diagram illustrating the behavior of a traditional cluster system.
Figure 17:
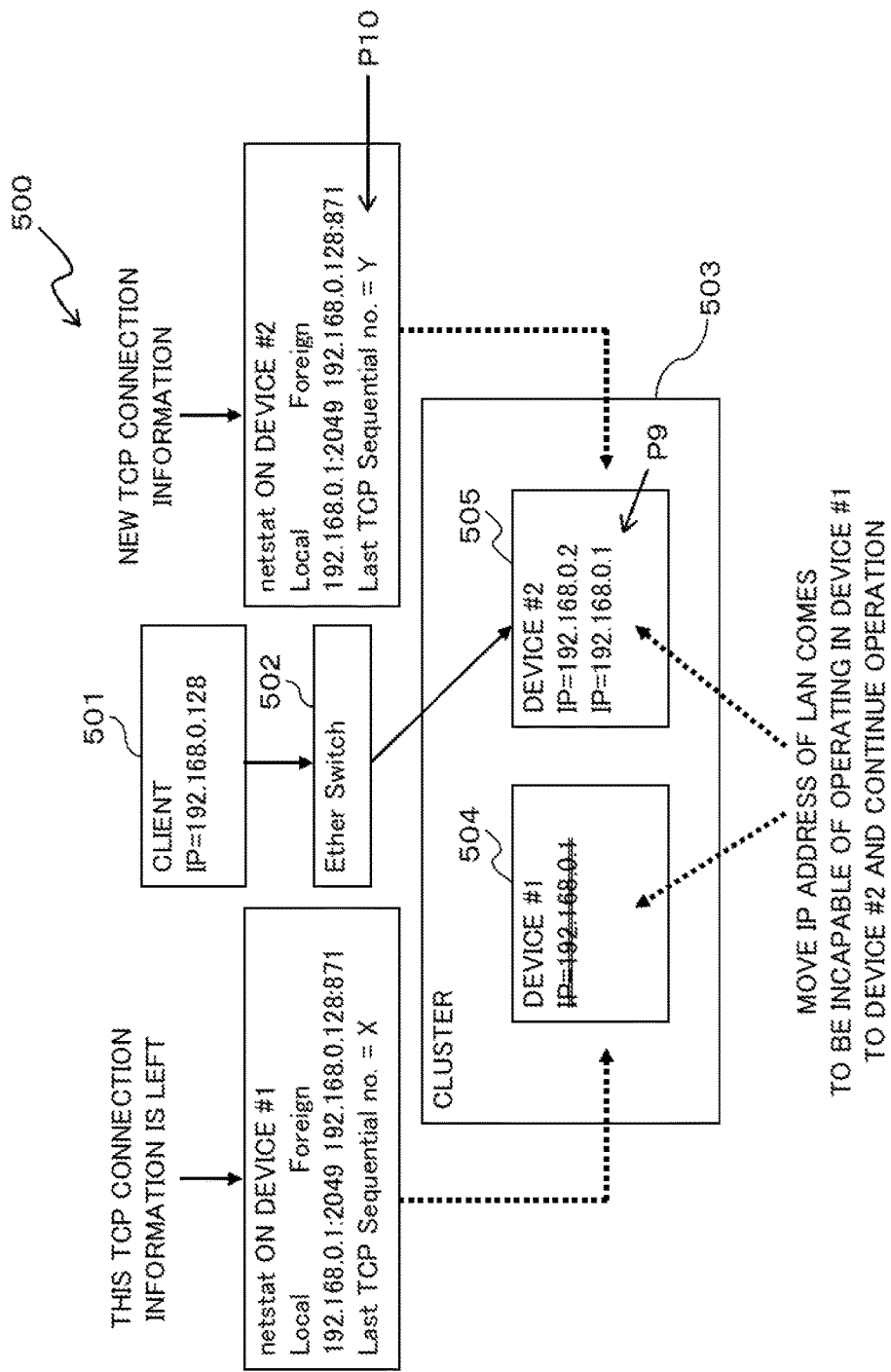
FIG. 17 is a diagram illustrating the behavior of a traditional cluster system.
Figure 18:
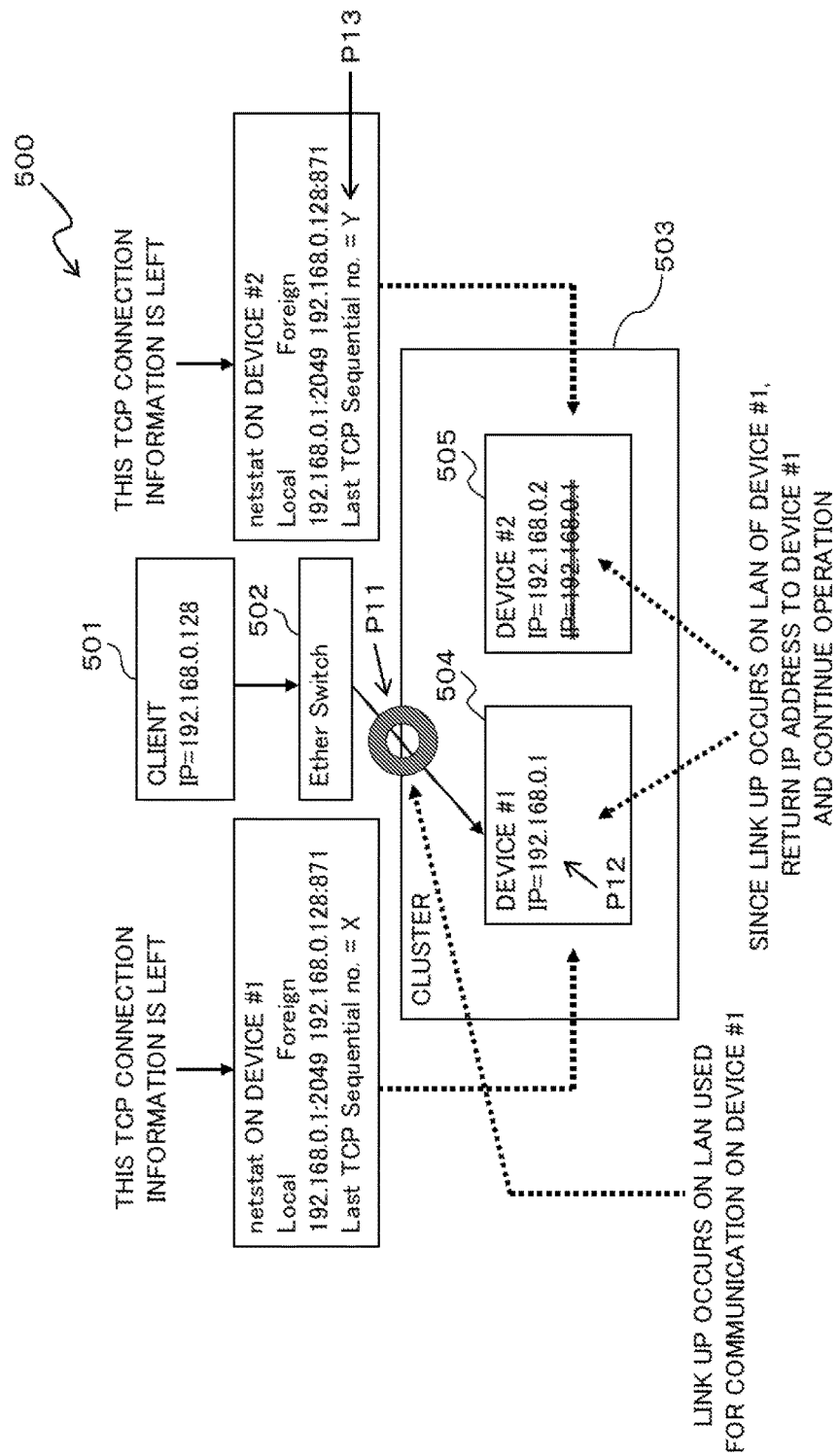
FIG. 18 is a diagram illustrating the behavior of a traditional cluster system.
Figure 19:
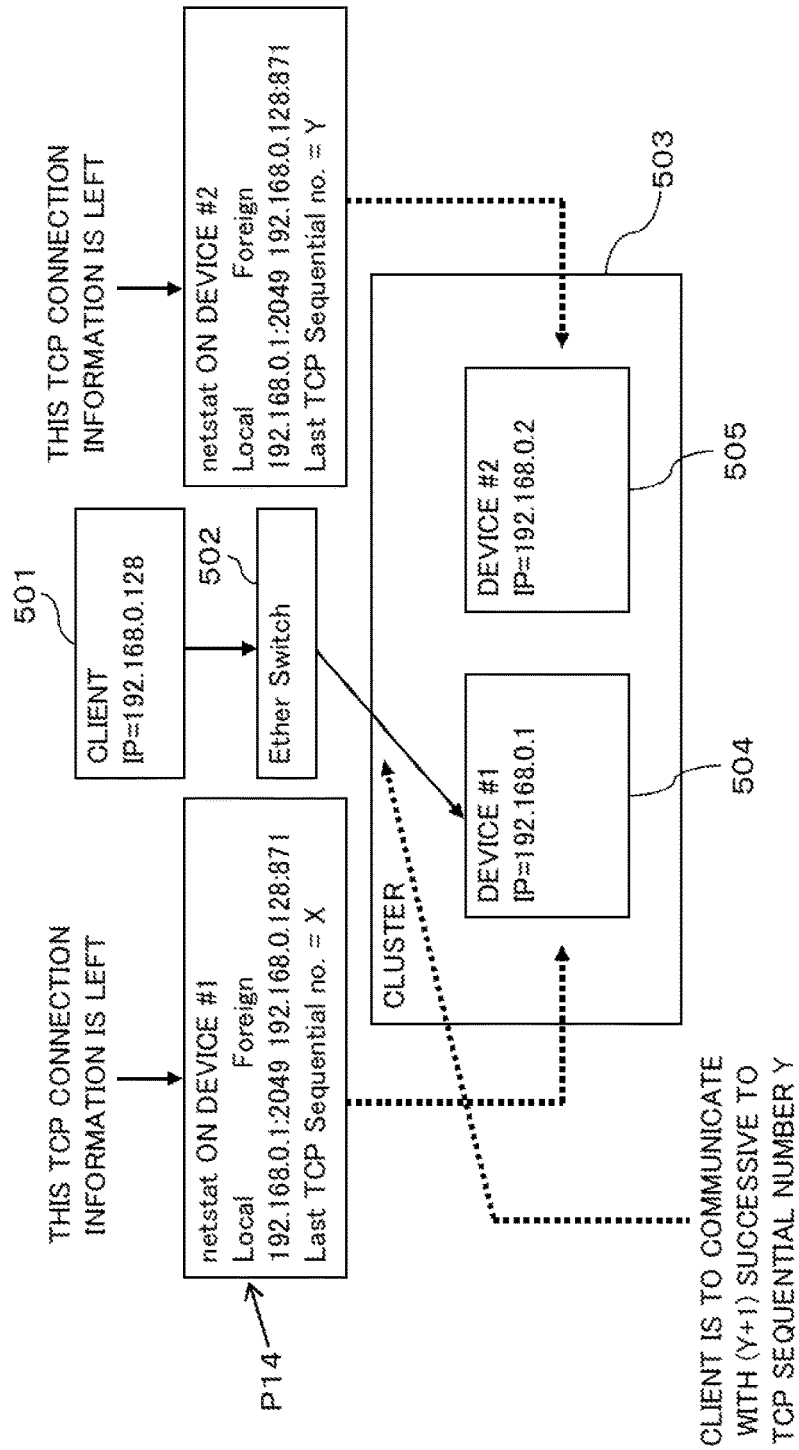
FIG. 19 is a diagram illustrating the behavior of a traditional cluster system.

The TCP connection information 60 is connection record information related to communication with an external device (in the first embodiment, the client 2). As illustrated in, for example, FIG. 11, the TCP connection information 60 includes the combination of the IP address and the port number of the client 2 being the communication counterpart, the local IP address and the local port number (of the CA 124 used for the communication of the local CM 111 with the client 2) in association with a sequential number (communication progress information) representing the progress of the communication.

The TCP connection information 60 includes information that can be referred by executing, for example, the netstat command of Linux®.

This means that the TCP connection information 60 is prepared for each combination (e.g., a combination of the client 2 and a storage device 10) of devices which communicate with each other by the TCP.

As illustrated in FIG. 2, the TCP connection information remover 11 includes the functions of a virtual Network Interface Card (NIC) setter 12, a table editor 13, a dummy packet generator 14, a reset packet sender 20, a dummy packet receiver 16, a TCP connection information comparator 17, a sequential number confirmer 18, an ACK packet sender 19, and a RST packet processor 21.

The virtual NIC setter (virtual communication interface setter) 12 prepares a single virtual communication interface (virtual NIC). A virtual NIC is an NIC virtually provided and behaves towards the OS as if an NIC exists.

The virtual NIC does not actually exist, and therefore is incapable of transmitting or receiving data from the viewpoint of hardware. Hereinafter, the virtual NIC is sometimes referred to as a virtual NIC driver.

In the present storage system 1, using the virtual NIC driver makes it possible to carry out packet operation on a kernel 15 (see FIG. 2) of the OS, so that the TCP connection information 60 that the kernel manages can be removed.

The dummy packet generator 14 generates a dummy TCP packet (dummy packet) that causes a receiver to falsely recognize that the sender is the client 2 and makes the above virtual NIC receive (process) the dummy packet.

The dummy packet generator 14 uses, as parameters, the local IP address and the local port number (that the CA 124 uses the communication of the local CM 111 with the client 2), the IP address and the port number of the client 2 being the connection destination, and two sequential numbers to generate a dummy packet.

The dummy packet generator 14 generates two dummy packets (a first dummy packet and a second dummy packet) largely different in the sequential number using two sequential numbers having values largely different (e.g., in order of magnitude) from each other.

For example, a sequential number "0x0" is set for the first dummy packet while a sequential number "0x80000000" is set for the second dummy packet.

A dummy packet uses the following settings (a) to (h) as parameters. This generates dummy packets (the first dummy packet and the second dummy packet) that look like as if a TCP ACK packet is received from the client 2 being the connection destination.

(a) set a sum of the MAC (Media Access Control) address of the virtual NIC and one in the sender MAC address;
(b) set the MAC address of the virtual NIC in the receiver MAC address;
(c) set local port number in the receiver port number;
(d) set local IP address in the receiver IP address;
(e) set the connection-destination IP address in the sender IP address;
(f) set the connection-destination port number in the sender port number;
(g) set only ACK in the TCP flag; and
(h) set the sequential number given as the parameter in the sequential number.

The dummy packet generator 14 registers the generated two dummy packets into the kernel 15 using ioctl I/F (InterFace) of the virtual NIC (input I/F process by the virtual NIC).

The function of the kernel 15 of a normal Linux® is incapable of pretending that the NIC receives an arbitrary packet.

As a solution to the above, using the ioctl I/F of the NIC driver that the kernel 15 has appends, to the virtual NIC driver, a process of registering a packet into the kernel 15 via the ioctl. This allows the kernel 15 to carryout a process as if an arbitrary packet is received via the virtual NIC.

The packet generated by the kernel 15 is transmitted by a process performed by the kernel 15 to a "packet registering process by the kernel 15" that is to be detailed below, so that the NIC looks like receiving a packet.

The table editor 13 edits a routing table 22 and an Address Resolution Protocol (ARP) table 23 in order to cause the virtual NIC to receive the dummy packets generated by the dummy packet generator 14. The information of the routing table 22 and the ARP table 23 is stored in, for example, a predetermined region of the memory 127 and managed by the kernel 15.

The routing table 22 includes information to manage, for example, the destination of a packet. The table editor 13 appends routing information to the routing table 22 such that a packet destined for the IP address of the client 2 being the connection destination passes through the virtual NIC.

In cases where the routing table 22 is not edited, communication passing through the virtual NIC is limited to "an IP address within a range of a subnet address allocated to the virtual NIC". For the above, if the connection destination is outside the subnet address, the packet does not passes through an outputting process of the virtual NIC. Consequently, in an outputting process of the virtual NIC, a reset packet sender 20 that is to be detailed below does not output a TCP RST packet, which means the TCP connection information removing process is not achieved.

The ARP table 23 is information representing the association between an IP address and a MAC address.

The table editor 13 makes a setting on the ARP table 23 such that the packet destined for the connection destination, that is, the IP address of the client 2, passes through the virtual NIC.

The table editor 13 additionally registers a unique arbitrary MAC address (dummy MAC address) as the MAC address of the virtual NIC into the ARP table 23. The table editor 13 associates the IP address of the client 2 being the connection destination with a value obtained by adding one to the MAC address of the virtual NIC.

Since the kernel 15 refers to the ARP table 23 to determine which NIC a packet is to pass through, the storage system 1 needs to edit the ARP table 23 as the above, so that a packet passes through the virtual NIC.

In the first embodiment, the MAC address to be set in the ARP table 23 is a sum of the MAC address of the virtual NIC and one, but is not limited to this. Alternatively, various alternatives can be suggested.

The dummy packet receiver 16 receives a dummy packet output from the dummy packet generator 14.

The TCP connection information comparator 17 compares the contents of the dummy packet received by the dummy packet receiver 16 with the TCP connection information 60 managed by the kernel 15.

Specifically, the TCP connection information comparator 17 compares the IP address and the port number of the sender of the dummy packet and the IP address and the port number of the receiver with those registered in the TCP connection information 60.

In cases where information in the dummy packet is not registered in the TCP connection information comparator 17, the dummy packet is ignored.

As described above, since the dummy packet is recognized as if being transmitted from the client 2, the dummy packet correctly generated is not ignored.

The sequential number confirmer 18 compares the sequential number received by the dummy packet receiver 16 with the sequential number being used for the last process and being managed by the kernel 15.

The sequential number confirmer 18 extracts the sequential number of the received dummy packet and stores the extracted sequential number into a predetermined region of, for example, the memory 127. Then, the sequential number confirmer 18 compares the sequential number of the received dummy packet (second dummy packet) with the sequential number of the dummy packet (first dummy packet) previously received and stored.

In this storage system 1, the storage system generates two dummy packets having sequential numbers largely different from each other as described above, and these dummy packets are transmitted in succession. Accordingly, at least two dummy packets that the dummy packet receiver 16 transmits in succession never have the same sequential number.

In cases where the sequential number of the received dummy packet (second dummy packet) mismatches the sequential number of the dummy packet (first dummy packet) processed for the last time as a result of the confirmation of the sequential number confirmer 18, an ACK packet sender 19 outputs an ACK attached thereto a correct sequential number from the virtual NIC.

In cases where the sequential number of the received dummy packet (second dummy packet) matches the sequential number of the dummy packet (first dummy packet) used in the last process, a process of transmitting an ACK packet is not carried out.

Here, the sequential number of a dummy packet received by the dummy packet receiver 16 may accidentally matched the sequential number of a packet received previously. However, as described above, since at least two dummy packets (the first dummy packet and the second dummy packet) that the dummy packet receiver 16 receives in succession never have the same sequential number, receiving two dummy packets inevitably detects mismatch in sequential number. Accordingly, the ACK packet sender 19 surely outputs an ACK packet attached thereto a correct sequential number.

Accordingly, generating a dummy packet that causes the receiver to falsely recognize that the sender is the client 2 and causing the virtual NIC to receive the dummy packet, the above dummy packet generator 14 functions as a communication progress information obtainer that obtains a sequential information (communication progress information) that represents the state of communication progress between the storage device 10-2 and the client 2.

The reset packet sender 20 extracts a sequential number from an ACK packet output from the ACK packet sender 19. Then, the reset packet sender 20 generates a TCP PST packet (reset packet) containing the extracted sequential number, the local IP address, and the IP address (foreign) of the client 2 being the connection destination, and transfers the generated packet to a receiving process of the NIC.

A TCP RST packet notifies the kernel 15 of the OS of apiece to be removed from the TCP connection information 60. In other words, the sequential number and IP addresses (local, foreign) contained in the TCP RST packet represent the piece to be removed from the TCP connection information 60.

Upon receipt of the TCP RST packet, the kernel 15 (RST packet processor 21) removes the piece of the TCP connection information 60 that is to be removed and that is notified by the received TCP RST packet.

Accordingly, the reset packet sender 20 functions as a reset packet generator that generates a TCP RST packet (reset packet) containing an obtained sequential number (communication progress information) using the sequential number.

On the basis of the TCP RST packet output from the reset packet sender 20, the RST packet processor 21 removes one piece of the TCP connection information 60 specified by the sequential number and the IP addresses (local, foreign) contained in the TCP RST packet from multiple pieces of the TCP connection information 60 prepared one for each communication pair (RST packet process).

Specifically, the RST packet processor 21 compares the sequential number and the IP addresses contained in the TCP RST packet with each pieces of the TCP connection information 60, and removes the piece of the TCP connection information 60 that has the sequential number and the IP addresses matching those contained in the TCP RST packet.

The functions of the dummy packet receiver 16, the TCP connection information comparator 17, the sequential number confirmer 18, the ACK packet sender 19, and the RST packet processor 21 are achieved by the function of the kernel 15 of the OS.

Specifically, the functions of the dummy packet receiver 16, the TCP connection information comparator 17, the sequential number confirmer 18, the ACK packet sender 19, and the RST packet processor 21 of the kernel 15 achieve the process of registering a dummy packet output from the dummy packet generator (i.e., the packet (dummy packet) registering process by the kernel 15). The packet (dummy packet) registering process by the kernel 15 will be detailed below by referring to FIGS. 8 and 9.

Here, the RST packet processor 21 functions as removal processor that removes the TCP connection information 60 (connection record information) between the storage device 10-2 and the client 2 connected to the storage device 10-2, the information being stored in the storage device 10-2, on the basis of a reset packet output from the reset packet sender 20.

Figure 3:
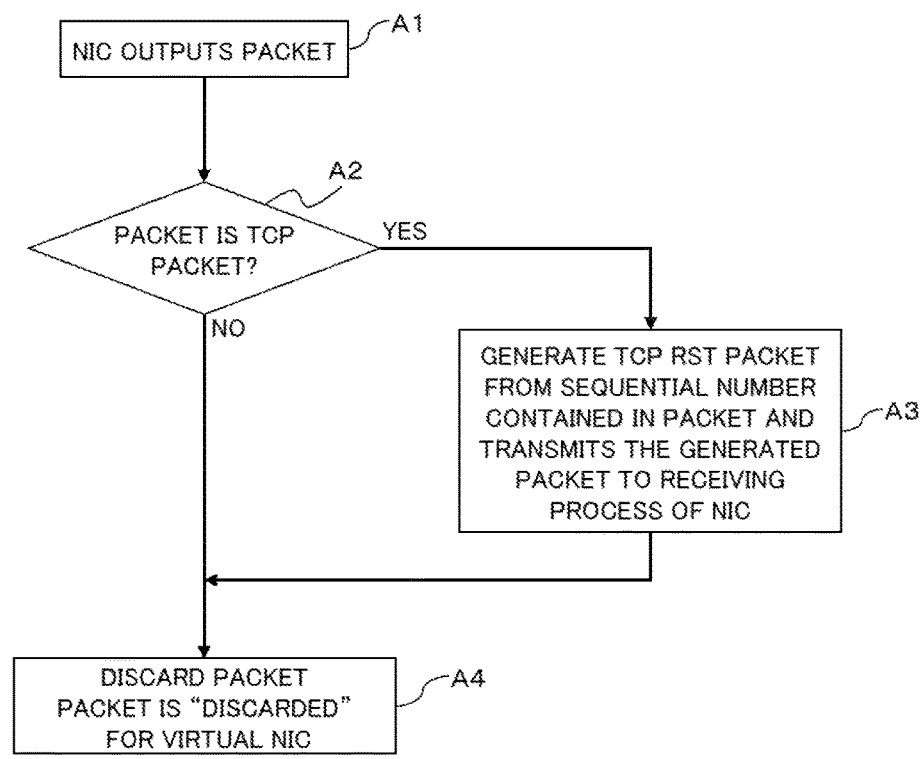
FIG. 3 is a flow diagram denoting a succession of procedural steps performed when a virtual NIC outputs a packet in a storage system of the first embodiment.

(B) Operation:

First of all, description will now be made in relation to a process (virtual NIC outputting process) performed when a packet is output by the virtual NIC in the storage system 1 of the first embodiment having the above configuration by referring to the flow diagram (steps A1-A4) of FIG. 3.

This process is permanently carried out after the storage device 10 is activated and is performed on all the packets passing through the process of transmission by the virtual NIC.

After the virtual NIC outputs a packet (step A1), the driver of the virtual NIC confirms whether the output packet is a TCP packet (step A2). If the packet is not a TCP packet (see NO route in step A2), the packet is discarded (step S4) and the process is finished.

In contrast, if the packet is a TCP packet (see YES route in step A2), the process moves to step A3, where the reset packet sender 20 generates a TCP RST packet using the sequential number extracted from the output packet and transmits the generated packet to the NIC receiving process. Then the process moves to step A4.

Figure 4:
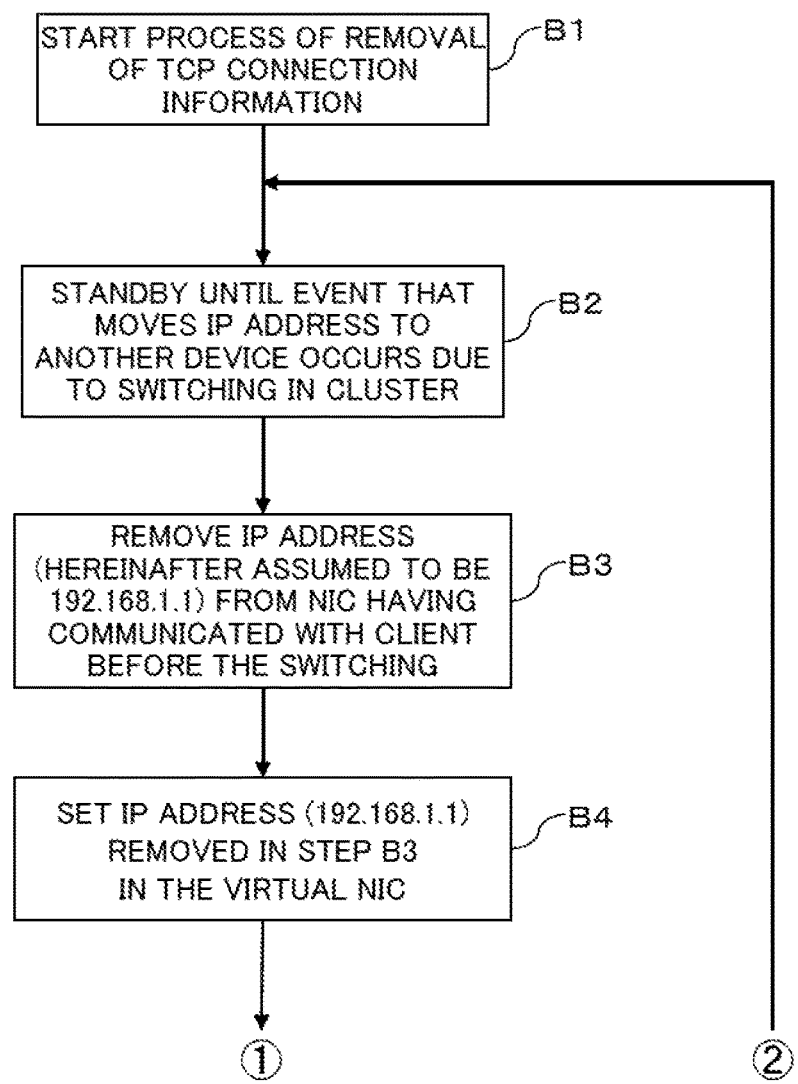
FIG. 4 is a diagram denoting a succession of procedural steps of a resident process related to removing TCP connection information in a storage system of the first embodiment.
Figure 5:
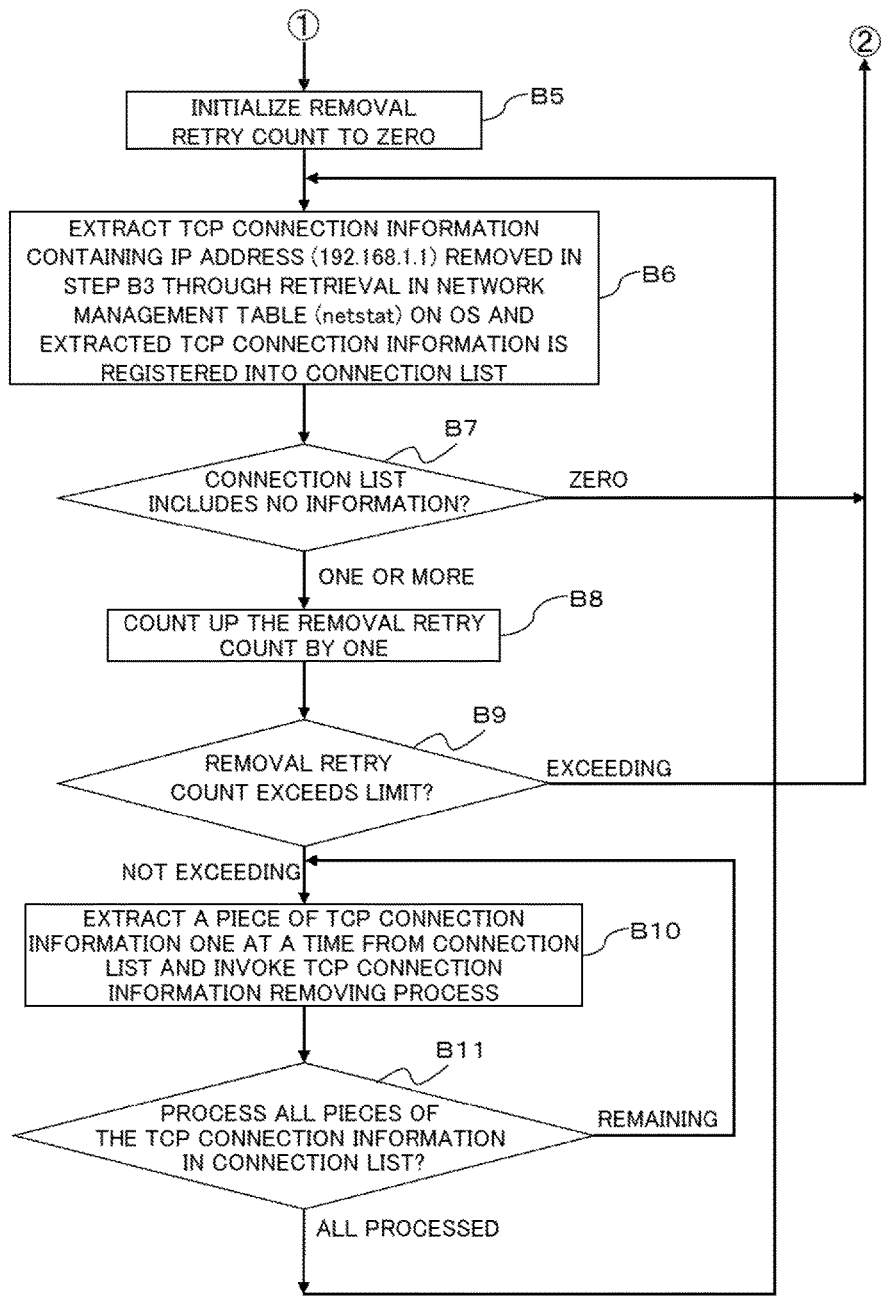
FIG. 5 is a diagram denoting a succession of procedural steps of a resident process related to removing TCP connection information in a storage system of the first embodiment.

Next, description will now be made in relation to a resident process related to removal of TCP connection information in the storage system 1 of the first embodiment with reference to flow diagrams (steps B1-B11) of FIGS. 4 and 5. FIG. 4 depicts steps B1-B4 and FIG. 5 depicts steps B5-B11.

This process is performed by the TCP connection information remover 11 and uses a removal retry count as a variable.

After the resident process related to removal of TCP connection information is started (step B1 of FIG. 4), the TCP connection information remover 11 is on standby until an event that moves IP address to another storage device 10 occurs due to switching in the cluster in step B2 of FIG. 4.

When an IP address is moved to another storage device 10 due to switching in the cluster, the storage device 10 of the moving destination carries out the following process.

Specifically, after an IP address removes to another storage device 10 due to switching in the cluster, the CM 11 of the storage device 10 of the moving destination removes the IP address from the NIC that has communicated with the client 2 just before (step B3 of FIG. 4). Hereinafter, the IP address to be moved is assumed to be "192.168.1.1".

The virtual NIC setter 12 sets the virtual NIC and further sets the IP address (192.168.1.1) removed in step B3 in the set virtual NIC (step B4 in FIG. 4).

Next, the TCP connection information remover 11 initializes the removal retry count by setting the count to "0" (step B5 in FIG. 5).

The TCP connection information remover 11 retrieves and extracts TCP connection information containing the IP address (192.168.1.1) removed in step B3 from a network management table (netstat) on the OS. The extracted TCP connection information is registered in a connection list (step B6 of FIG. 5). The information in the connection list is stored in, for example, a predetermined region of the memory 127.

Then, the TCP connection information remover 11 confirms the number of pieces of the TCP connection information registered in the connection list (step B7 of FIG. 5). If no information is registered in the connection list, that is, if the number of registered information pieces is zero (see route "zero" of step B7), the process returns to step B2.

If one or more pieces of the TCP connection information is registered in the connection list (see "ONE OR MORE" route in step B7), the TCP connection information remover 11 counts up the removal retry count (in increment of one) (step B8 of FIG. 5).

Then, the TCP connection information remover 11 confirms whether the value of the removal retry count exceeds a predetermined limit value (threshold). If the value of the removal retry count exceeds the limit value (see "EXCEEDING" route of step B9), the process returns to step B2. This means that carrying out the process of steps B2-B7 predetermined number of times (the number of times of the limit number or more) by way of precaution makes it possible to enhance the reliability. An example of the limit number is three.

In contrast, if the value of the removal retry count does not exceed the limit value (see "NOT EXCEEDING" route of step B9), the process moves to step B10 of FIG. 5.

In step B10, the TCP connection information remover 11 extracts a piece of the TCP connection information 60 one at a time from the connection list and carries out a TCP connection information removing process to be detailed below with reference to FIG. 6.

The TCP connection information remover 11 confirms whether the process of step B10 has been carried out on all the pieces of the TCP connection information registered in the connection list (step B11 of FIG. 5). As a result of the confirmation, if a piece of the TCP connection information not having been processed is left (see "REMAINING" route in step B11), the process returns to step B10.

If no piece of the TCP connection information not having been processed is left in the connection list, which means that if all the pieces of the TCP connection information in the connection list have undergone the TCP connection information removing process (see "ALL PROCESSED" route in step B11), the process returns to step B6.

Next, the description will now be made in relation to the TCP connection information removing process in the storage system 1 of the first embodiment with reference to the flow diagram (steps C1-C4) of FIG. 6.

In step C1, the table editor 13 modifies the routing table 22 and the ARP table 23 such that the communication destined for the IP address of the connection destination (client 2) passes through the virtual NIC.

In step C2, the TCP connection information remover 11 invokes a TCP connection information removing subroutine. In executing the TCP connection information removing subroutine, the TCP connection information remover 11 is provided with parameters of the local IP address and the local port number, the IP address and the port number of the client 2 being the communication destination, and the sequential number "0x0".

The TCP connection information removing subroutine will be described below by referring to FIG. 7.

In step C3, the TCP connection information remover 11 invokes the TCP information removing subroutine. Likewise step C2, the TCP connection information remover 11 is provided with parameters of the local IP address and the local port number, and the IP address and the port number of the client 2 being the communication destination. In contrast, the sequential number provided as a parameter in step C3 is "0x80000000", which is largely different from that provided in step C2.

In step C4, the table editor 13 restores the routing table 22 and the ARP table 23 modified in step C1 to the respective states before the modification, and finishes the process.

Next, description will now be made in relation to the TCP connection information removing subroutine in the storage system 1 of the first embodiment with reference to the flow diagram (steps D1-D2) of FIG. 7.

In step D1, the dummy packet generator 14 generates a dummy packet (TCP packet).

A dummy packet has following settings (a)-(h) as parameters.

(a) sum of 1 and MAC address of the virtual NIC in a transmission source MAC address;
(b) MAC address of the virtual NIC in the receiver MAC address;
(c) local port number in a receiver port number;
(d) local IP address in a sender IP address;
(e) connection destination IP address in the sender IP address;
(f) connection destination port number in a sender port number;
(g) only ACK in TCP flag; and
(h) the sequential number given as a parameter in the sequential number.

In step D2, using the ioctl, the dummy packet generator 14 causes the virtual NIC to receive (process) the dummy packet generated in step D1. Consequently, the packet is transferred to the packet registering process (1) by kernel 15 that is to be detailed below by referring to FIG. 8.

The, the process is finished.

Figure 7:
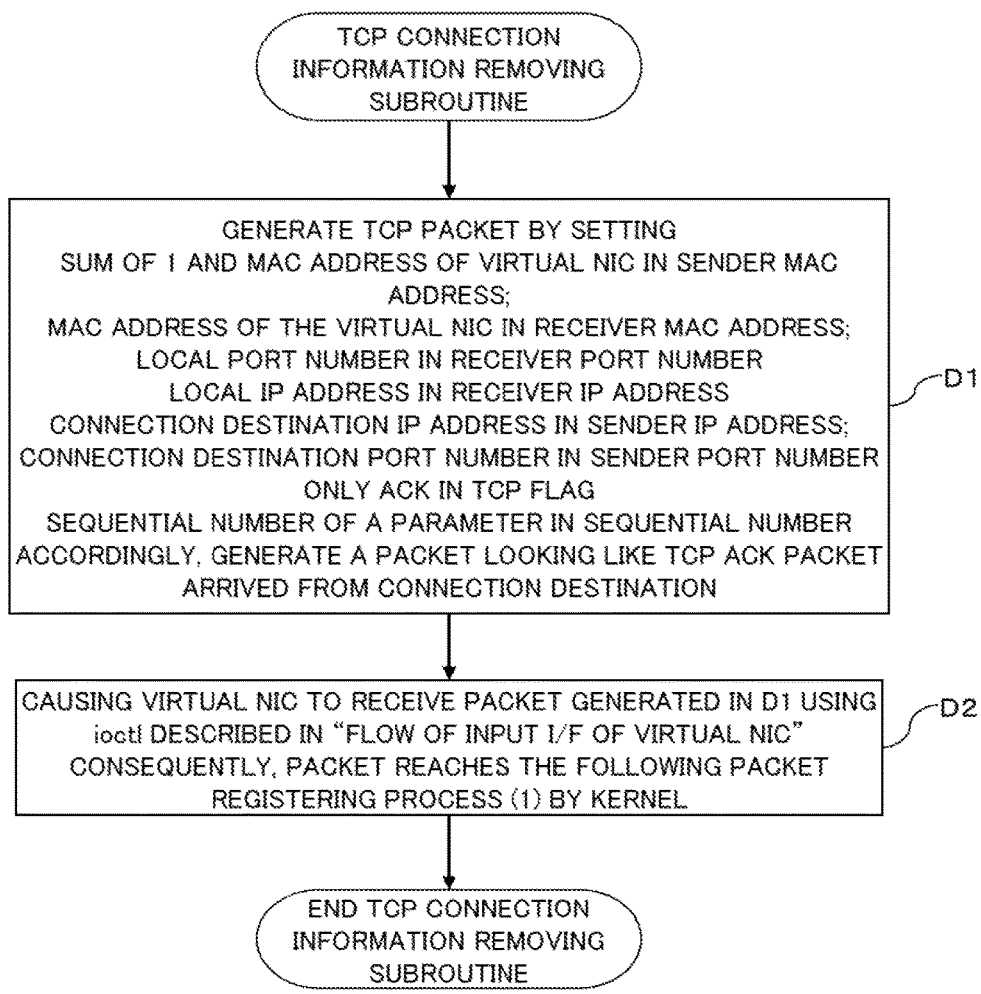
FIG. 7 is a flow diagram denoting a succession of procedural steps of a process for a TCP connection information removing subroutine in a storage system of the first embodiment.

The process of FIG. 7 is carried out twice one using each of the two sequential numbers. Thereby, two dummy packets (the first dummy packet and the second dummy packet) having different sequential numbers are generated.

Figure 6:
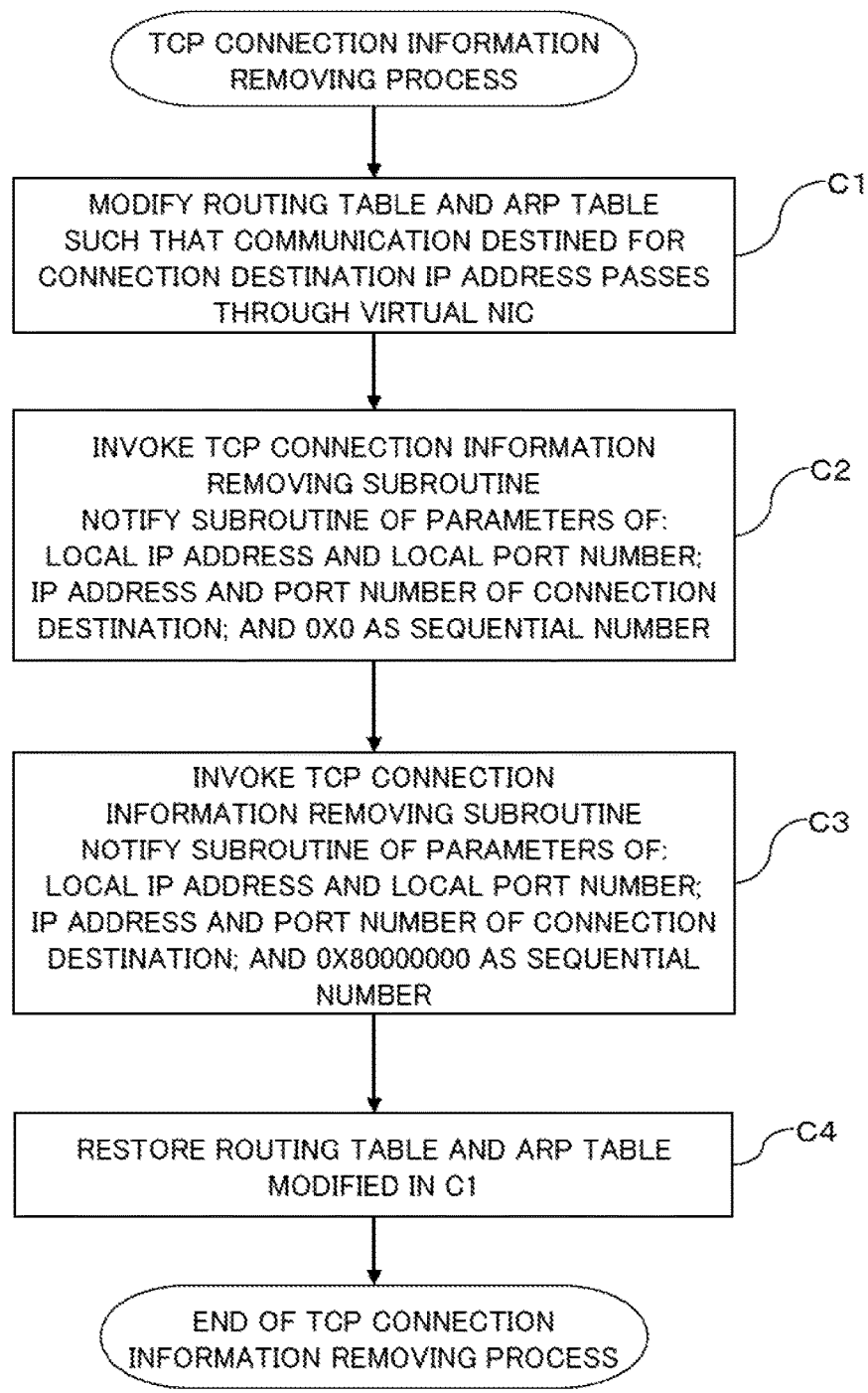
FIG. 6 is a diagram denoting a succession of procedural steps of removing TCP connection information in a storage system of the first embodiment.

Specifically, the parameter "0x0" prepared in step C2 in the flow diagram of FIG. 6 is set to be the sequential number in the first dummy packet while the parameter "0x80000000" prepared in step C3 in the flow diagram of FIG. 6 is set to be the sequential number in the second packet.

Figure 8:
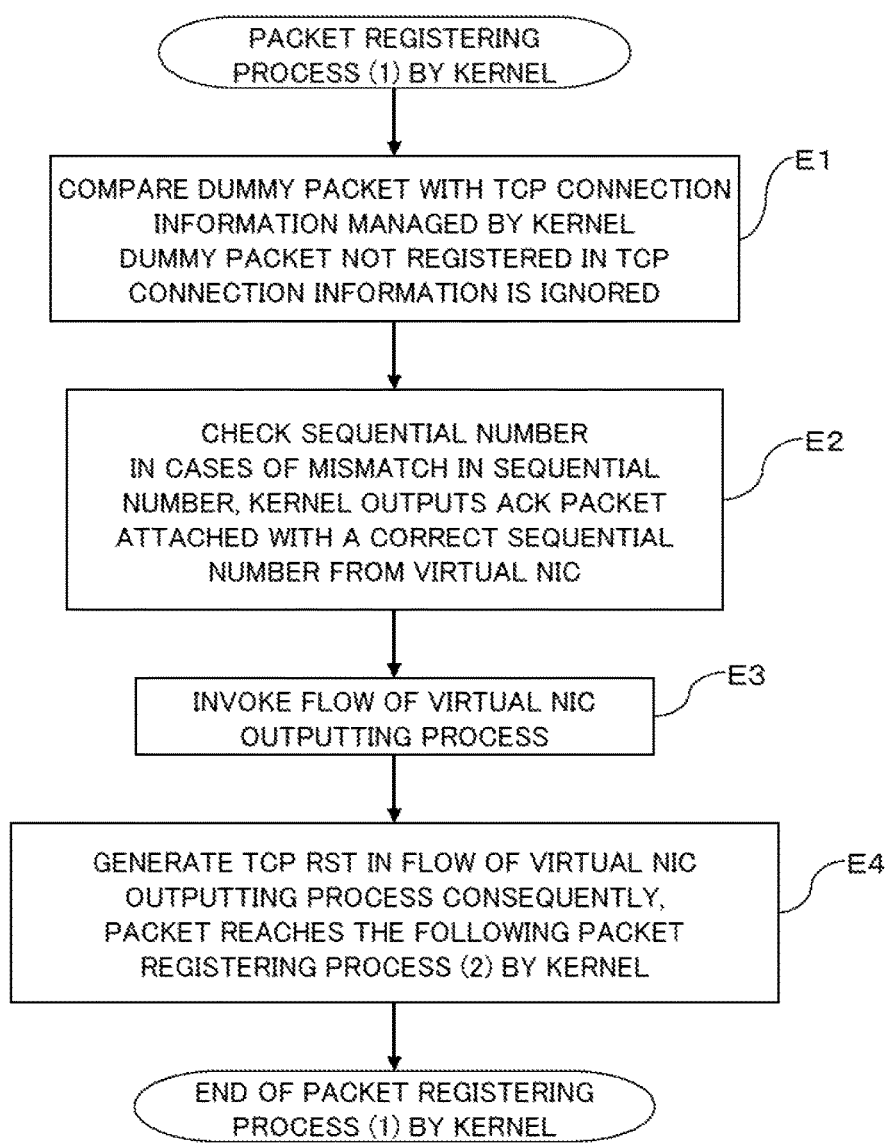
FIG. 8 is a flow diagram denoting a succession of procedural steps of a packet registering process (1) by a kernel in a storage system of the first embodiment.

Next, description will now be made in relation to the packet registering process (1) by the kernel 15 in the storage system 1 of the first embodiment with reference to the flow diagram (steps E1-E4) of FIG. 8.

The dummy packet receiver 16 receives a dummy packet generated by the dummy packet generator 14.

In step E1, the TCP connection information comparator 17 compares the dummy packet received by the dummy packet receiver 16 with the TCP connection information 60 managed by the kernel 15.

If the information in the dummy packet is not registered in the TCP connection information comparator 17, the dummy packet is ignored.

In step E2, the sequential number confirmer 18 compares the sequential number of the dummy packet received by the dummy packet receiver 16 with the sequential number being used in the last process and being managed by the kernel 15.

If the sequential number of the dummy packet (second dummy packet) does not match the sequential number of the dummy packet (first dummy packet) dealt in the last process as result of the comparison by the sequential number confirmer 18, the ACK packet sender 19 outputs an ACK packet attached thereto a correct sequential number from the virtual NIC.

In step E3, the virtual NIC outputting process is invoked, in which a TCP RST packet is generated. Thereby, a packet is transferred to a packet registering process (2) of the kernel 15 (step E4) and the packet registering process (1) of the kernel is finished.

Figure 9:
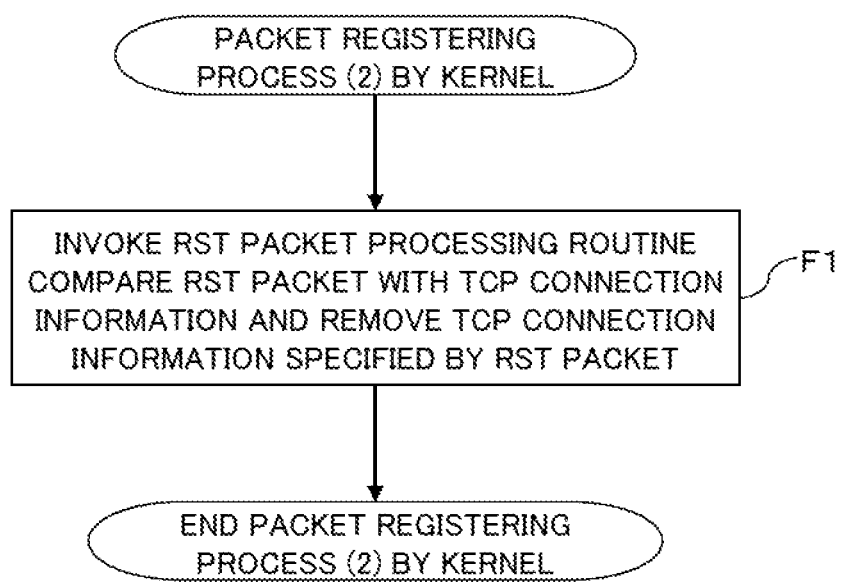
FIG. 9 is a flow diagram denoting a succession of procedural steps of a packet registering process (2) by a kernel in a storage system of the first embodiment.
Figure 10:
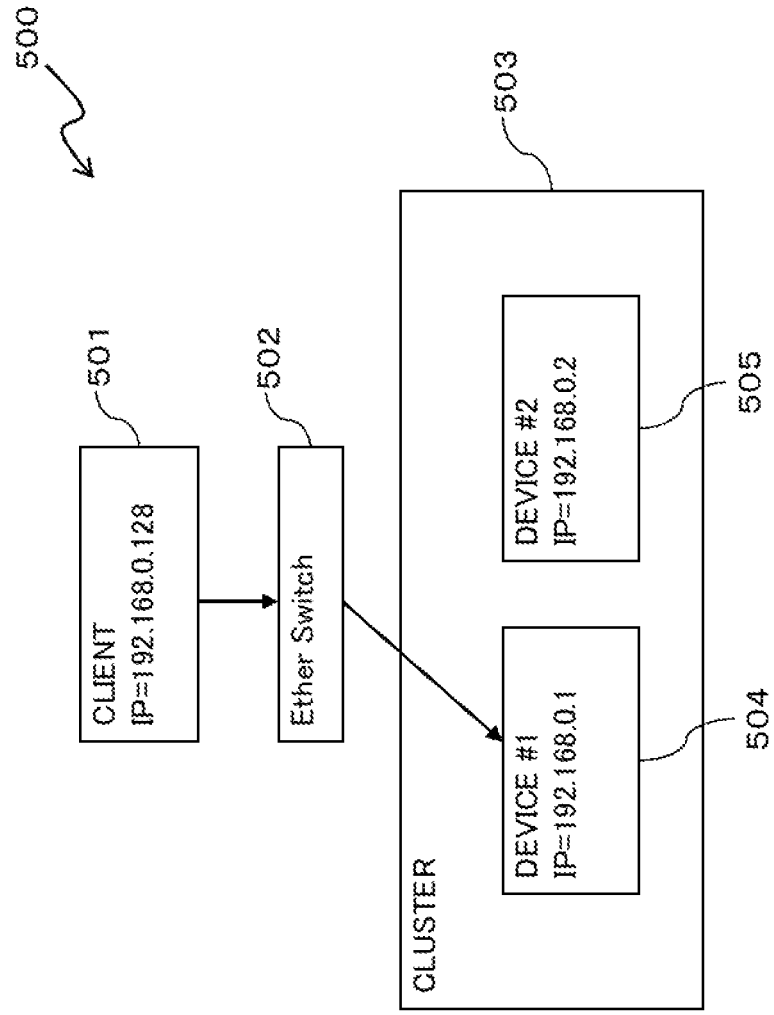
FIG. 10 is a diagram illustrating the behavior of a traditional cluster system.

Next, description will now be made in relation to the packet registering process (2) by the kernel 15 in the storage system 1 of the first embodiment with reference to the flow diagram (step F1) of FIG. 9.

The packet registering process (2) invokes, in step F1, a RST packet process routine to be carried out by the RST packet processor 21.

In detail, the RST packet processor 21 compares the sequential number and the IP addresses contained in the TCP RST packet with multiple pieces of the TCP connection information 60 on the basis of the TCP packet output from the reset packet sender 20. Then, the RST packet processor 21 removes the piece of the TCP connection information 60 which piece is specified by the sequential number and the IP addresses (local, foreign) contained in the TCP RST packet, and finishes the process.

(C) Effect:

As described above, in the storage system 1 of the first embodiment, the virtual NIC setter 12 sets the virtual NIC and the dummy packet generator generates a dummy packet that causes the virtual NIC to falsely recognize that the packet is transmitted from the client 2 and process the dummy packet.

The sequential number confirmer 18 compares the sequential number of the received dummy packet with the sequential number being used in the last process and being managed by the kernel 15. If the sequential numbers do not match, the ACK packet sender 19 outputs an ACK packet attached thereto a correct sequential number from the virtual NIC.

After that, a TCP RST packet containing the correct sequential number is generated and the RST packet processor 21 removes an unnecessary piece of the TCP connection information 60 related to the IP address removed due to switching in the clustering from the multiple pieces of the TCP connection information 60 on the basis of the TCP RST packet.

This can successfully remove an unnecessary piece of the TCP connection information 60 incurred in the storage device 10 of the switching source due to switching in the cluster.

Removing the unnecessary piece of the TCP connection information 60 releases the region of the memory 127 in the cluster, and also prohibits congestion of TCP ACK, so that the network can be used efficiently and delay in switching of the cluster due to congestion of TCP ACK can be prohibited.

Since the dummy packet generator 14 generates and transmits two dummy packets having sequential numbers largely different from each other, the sequential number confirmer 18 can surely detect mismatch between the two sequential numbers.

Setting the virtual NIC by the virtual NIC setter 12 makes the above TCP connection information removing process to be accomplished without affecting any communication devices such as the CA 124, and therefore provides high advantages.

(D) Others:

The disclosed technique is not limited to the above first embodiment and various changes and modifications can be suggested without departing from the spirit of the first embodiment. The configurations and processes may be omitted, selected, or combined according to the requirement.

For example, the first embodiment assumes that the OS executed by the CPU 110 of each CM 111 is Linux®. The OS is not limited to this and various modification can be suggested.

In the first embodiment, the kernel 15 has the functions of the dummy packet receiver 16, the TCP connection information comparator 17, the sequential number confirmer 18, the ACK packet sender 19, and the RST packet processor 21. Alternatively, at least one of these functions may be imparted by an entity outside of the kernel 15.

The first embodiment can be carried out and fabricated by those ordinary skilled in the art referring to the above disclosure.

The first embodiment can prevent congestion from occurring when a processor is switched to another processor in a cluster system.

All examples and conditional language recited herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present inventions have been described in detail, it should be understood that the various changes, substitutions, and alterations could be made hereto without departing from the spirit and scope of the invention.

What is claimed is:

1. A network controller for a cluster system, the cluster system including a first processing device and a second processing device and being communicably connected with a connection destination device, the network controller being included in the second processing device and comprising a processor that:
   in a case where a communication counterpart with the communication destination device is switched from the second processing device to the first processing device,
   sets a virtual communication interface;
   generates a dummy packet that causes a receiver of the dummy packet to falsely recognize that the dummy packet is transmitted from the connection destination device;
   process the generated dummy packet as if the generated dummy packet is received via the virtual communication interface;
   obtains communication progress information representing a communication progress state of communication of the second processing device with the connection destination device, the communication progress information being output in response to the dummy packet;
   generates a reset packet containing the communication progress information using the obtained communication progress information;
   removes, based on the reset packet, connection record information of the second processing device and the connection destination device, the connection record information being stored in the second processing device;
   outputs the dummy packet containing provisional communication progress information;
   outputs a response packet containing the communication progress information managed in the second processing device from the virtual communication interface in response to the dummy packet; and
   generates the reset packet using the communication progress information contained in the response packet.

2. The network controller according to claim 1, wherein the processor outputs two of the dummy packet different in the provisional communication progress information set therein.

3. A cluster system including a first processing device and a second processing device and being communicably connected with a connection destination device, the cluster system comprising a processor, being disposed in the second processing device, that:
   in a case where a communication counterpart with the communication destination device is switched from the second processing device to the first processing device,
   sets a virtual communication interface;
   generates a dummy packet that causes a receiver of the dummy packet to falsely recognize that the dummy packet is transmitted from the connection destination device;
   process the generated dummy packet as if the generated dummy packet is received via the virtual communication interface;
   obtains communication progress information representing a communication progress state of communication of the second processing device with the connection destination device, the communication progress information being output in response to the dummy packet;
   generates a reset packet containing the communication progress information using the obtained communication progress information;
   removes, based on the reset packet, connection record information of the second processing device and the connection destination device, the connection record information being stored in the second processing device;
   outputs the dummy packet containing provisional communication progress information;
   outputs a response packet containing the communication progress information managed in the second processing device from the virtual communication interface in response to the dummy packet; and
   generates the reset packet using the communication progress information contained in the response packet.

4. The cluster system according to claim 3, wherein the processor outputs two of the dummy packet different in the provisional communication progress information set therein.

5. A non-transitory computer-readable recording medium having stored therein a control program for a cluster system including a first processing device and a second processing device and being communicably connected with a connection destination device, the control program causing a processor included in the second processing device to execute a process comprising:

in a case where a communication counterpart with the communication destination device is switched from the second processing device to the first processing device, setting a virtual communication interface;

generating a dummy packet that causes a receiver of the dummy packet to falsely recognize that the dummy packet is transmitted from the connection destination device;

processing the generated dummy packet as if the generated dummy packet is received via the virtual communication interface;

obtains communication progress information representing a communication progress state of communication of the second processing device with the connection destination device, the communication progress information being output in response to the dummy packet;

generating a reset packet containing the communication progress information using the obtained communication progress information;

removing, based on the reset packet, connection record information of the second processing device and the connection destination device, the connection record information being stored in the second processing device;

outputting the dummy packet containing provisional communication progress information;

outputting a response packet containing the communication progress information managed in the second processing device from the virtual communication interface in response to the dummy packet; and generating the reset packet using the communication progress information contained in the response packet.

6. The non-transitory computer-readable recording medium according to claim 5, wherein the process further comprises:

outputting two of the dummy packet different in the provisional communication progress information set therein.

* * * * *